US006879328B2

(12) United States Patent
Deering

(10) Patent No.: US 6,879,328 B2
(45) Date of Patent: Apr. 12, 2005

(54) SUPPORT OF MULTI-LAYER TRANSPARENCY

(75) Inventor: Michael F. Deering, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 13 days.

(21) Appl. No.: 10/378,048

(22) Filed: Mar. 3, 2003

(65) Prior Publication Data

US 2004/0174376 A1 Sep. 9, 2004

(51) Int. Cl.$^7$ ................................................. G09G 5/02
(52) U.S. Cl. ........................ 345/592; 345/581; 345/543
(58) Field of Search ................................ 345/420, 421, 345/422, 426, 581, 582, 589, 592, 543, 544, 552

(56) References Cited

U.S. PATENT DOCUMENTS

| | | | |
|---|---|---|---|
| 5,455,902 A | 10/1995 | Ellson et al. | |
| 6,424,343 B1 | 7/2002 | Deering et al. | |
| 6,426,755 B1 * | 7/2002 | Deering | 345/581 |
| 6,466,210 B1 | 10/2002 | Carlsen et al. | |
| 2002/0171672 A1 | 11/2002 | Lavelle et al. | |
| 2004/0080512 A1 * | 4/2004 | McCormack et al. | 345/543 |

OTHER PUBLICATIONS

Norman P. Jouppi and Chun–Fa Chang, "$Z_3$ : An Economical Hardware Technique for High–Quality Antialoasing and Transparency, " Proceedings of the ACM Siggraph/Eurographics workshop on Graphics Hardware, Aug. 8–9, 1999, Los Angeles, California, United States, pp. 85–93.

Haeberli, P. et al., "The Accumulation Buffer: Hardware Support for High–Quality Rendering, " Computer Graphics, vol. 24, No. 4, Aug. 1990, pp. 309–318.

Sung, K. et al., "Design and Implementation of the Maya Renderer, " Computer Graphics and Applications, Pacific Graphics '98, Sixth Pacific Conference on Singapore, Oct. 26–29, 1998. IEEE Comput. Soc., Oct. 26, 1998, pp. 150–159.

International Search Report, Application PCT/US2004/006255, Mailed Sep. 13, 2004.

* cited by examiner

Primary Examiner—Matthew Luu
(74) Attorney, Agent, or Firm—Meyertons Hood Kivlin Kowert & Goetzel, P.C.; Jeffrey C. Hood

(57) ABSTRACT

A system and method for generating graphics images from 3-dimensional graphics data representing one or more transparent objects and one or more opaque objects are disclosed. Memory locations for storing transparent samples may be provided by reducing the number of opaque samples per pixel as needed, and storing the transparent samples in the memory locations formerly used to store the discarded opaque samples. A plurality of opaque samples for a plurality of sample positions corresponding to a pixel may be initially stored in a sample memory. A transparent sample rendered for one of the plurality of sample positions may replace an opaque sample in another one of the sample positions of the plurality of sample positions. The transparent and opaque samples rendered for the same position may be blended and the blended samples may be filtered at least once per screen refresh cycle to generate output pixels.

48 Claims, 15 Drawing Sheets

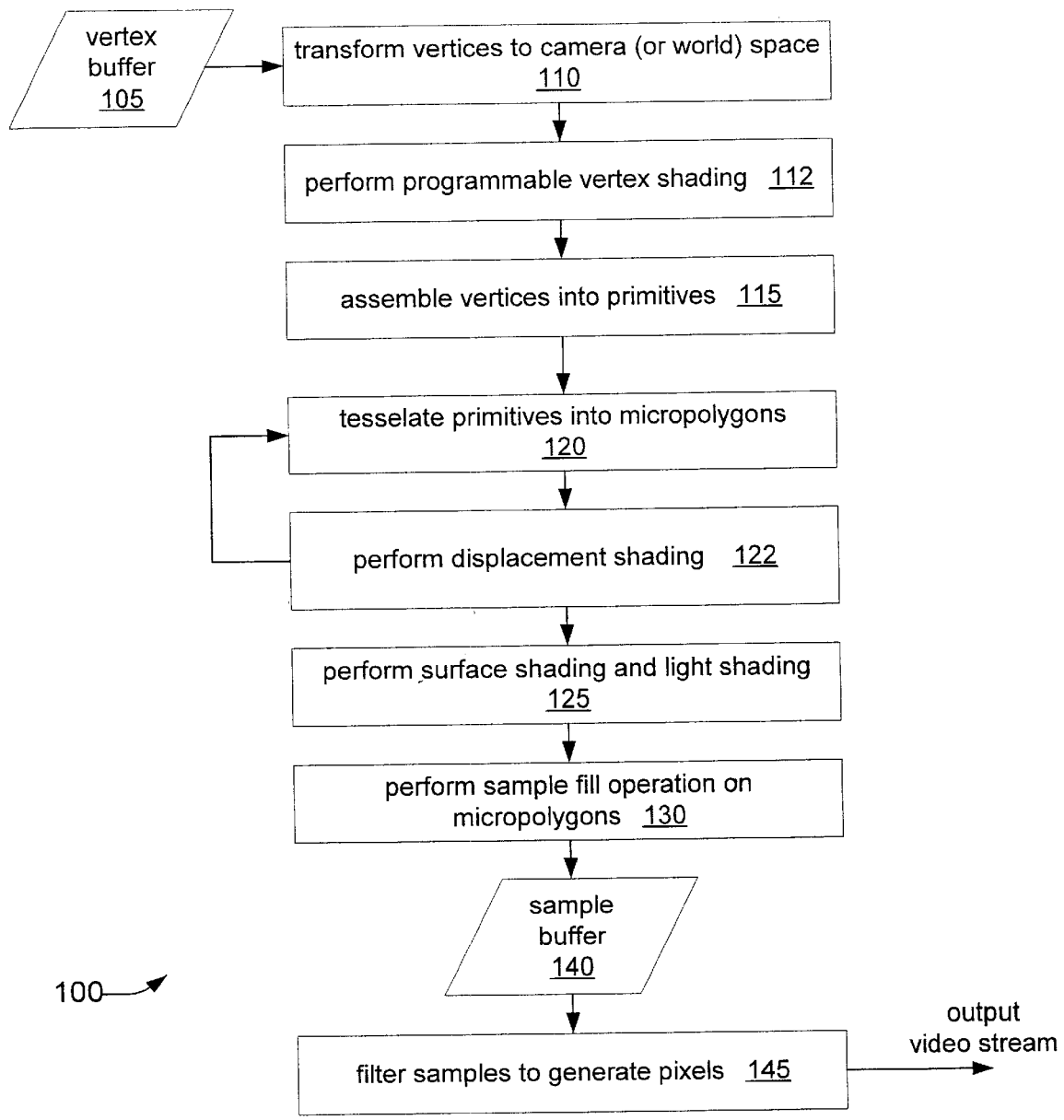
Fig. 1: Rendering Pipeline

SUPPORT OF MULTI-LAYER TRANSPARENCY

BACKGROUND OF THE INVENTION

1. Field of the Invention

This invention relates generally to the field of high performance computer graphics systems and, more particularly, to real time rendering of graphics data representing transparent and opaque objects.

2. Description of the Related Art

In recent years, the demand for high performance graphics systems that can render complex three-dimensional (3D) objects and scenes realistically has increased substantially. Modern high performance graphics systems also support special effects such as anti-aliasing, texturing, shading, fogging, alpha-blending, and specular highlighting. The increase in demand for better performance is at least in part due to new applications such as computer-generated animation for motion pictures, virtual reality simulators/trainers, and interactive computer games.

Many of the images of interest in these new applications include transparent objects. Previous methods of processing transparent objects involve off-line graphics systems and software that slowly generate a series of graphic images one frame at a time. A system and method adaptable to high-speed graphics systems capable of generating images at increased rates (e.g., video rates) is needed.

SUMMARY

The problems set forth above may at least in part be solved by a system and method for generating graphics images (e.g., at video rates), from 3-dimensional graphics data representing one or more transparent objects and one or more opaque objects. The method provides memory locations for storing transparent samples by reducing the number of opaque samples per pixel as needed, and stores the transparent samples in the memory locations formerly used to store the discarded opaque samples.

A plurality of opaque samples for a plurality of sample positions corresponding to a pixel may be initially stored in a sample memory. A transparent sample rendered for one of the plurality of sample positions may replace an opaque sample in another one of the sample positions of the plurality of sample positions. The transparent and opaque samples rendered for the same position may be blended and the blended samples may be filtered at least once per screen refresh cycle to generate output pixels.

This method for generating graphics images from 3-dimensional graphics data may include receiving in one or more passes a plurality of graphics primitives representing one or more transparent objects and one or more opaque objects, rendering the graphics primitives to samples, storing the rendered samples in a sample buffer (an opaque sample stored in the sample buffer may have one or more corresponding transparent samples rendered for the same sample position stored in neighboring memory locations), blending the transparent and opaque samples rendered for the same position, filtering the blended samples at least once per screen refresh cycle to generate output pixels, and providing the output pixels to a display device. In some embodiments, the output pixels may not be stored in a frame buffer, but instead may be generated as needed.

In some images, the number of transparent samples for a sample position may exceed the maximum possible number of memory locations that may be allocated. In these cases, one or more samples for the most transparent objects may be discarded so that the number of transparent samples equals the available number of memory locations.

A graphics system capable of generating dynamic images of transparent and opaque objects may include one or more input devices coupled to a host processor, one or more graphics processors that may receive 3-dimensional graphics data and instructions from the host processor and generate in one or more passes a plurality of transparent and opaque samples from the graphics data, one or more memories that may receive and store the samples from the one or more graphics processors, one or more sample-to-pixel calculation units that may receive opaque and transparent samples from the one or more memories, and generate output pixels, and one or more output units that may receive the output pixels and send corresponding output signals to one or more display devices. The one or more sample-to-pixel calculation units may generate output pixels in real time.

Each sample-to-pixel calculation unit may include a sample values blending unit that may re-order transparent samples that have a common sample position, in order of decreasing depth value and may blend the transparent samples with the corresponding opaque sample.

In some embodiments, each memory may include a depth value compare and sort unit that performs a depth value comparison for multiple opaque objects at a sample position and only stores sample values for the opaque object with a minimum depth value. The depth value compare and sort unit may also perform a depth value comparison for multiple transparent objects at a sample position and may store the sample values for the multiple transparent objects in order of decreasing depth value. In these embodiments, each sample-to-pixel calculation unit may include a sample values blending unit that blends transparent samples that have been ordered by decreasing depth value with the corresponding opaque sample.

In one set of embodiments, the host sends the opaque objects of a scene to the graphics processors in a first rendering pass. At the conclusion of the first rendering pass, the sample buffer contains a frame of opaque samples which represent the visible surface of the opaque object set with respect to the viewer. After the first rendering pass, the host may send down the transparent objects of a scene to the graphics processors. In the second rendering pass, the graphics processors and sample buffer may execute the methodology described above for increasing the number of transparent samples stored per sample position at the expense of decreasing the spatial resolution of sample positions with a render pixel (or tile of render pixels). Any transparent sample that is farther from the viewer than the opaque sample at the same sample position may be immediately discarded.

In another set of embodiments, the host sends down a mixed stream of opaque objects and transparent objects. In this case, a transparent sample may be carried for a period of time until it is superceded by a subsequently discovered opaque sample closer to the viewer at the same sample position.

In other embodiments, the graphics system may render opaque and transparent objects in any desired number of rendering passes.

BRIEF DESCRIPTION OF THE DRAWINGS

A better understanding of the present invention can be obtained when the following detailed description is considered in conjunction with the following drawings, in which:

FIG. 1 illustrates one set of embodiments of a graphics-rendering pipeline;

Figure 2A:
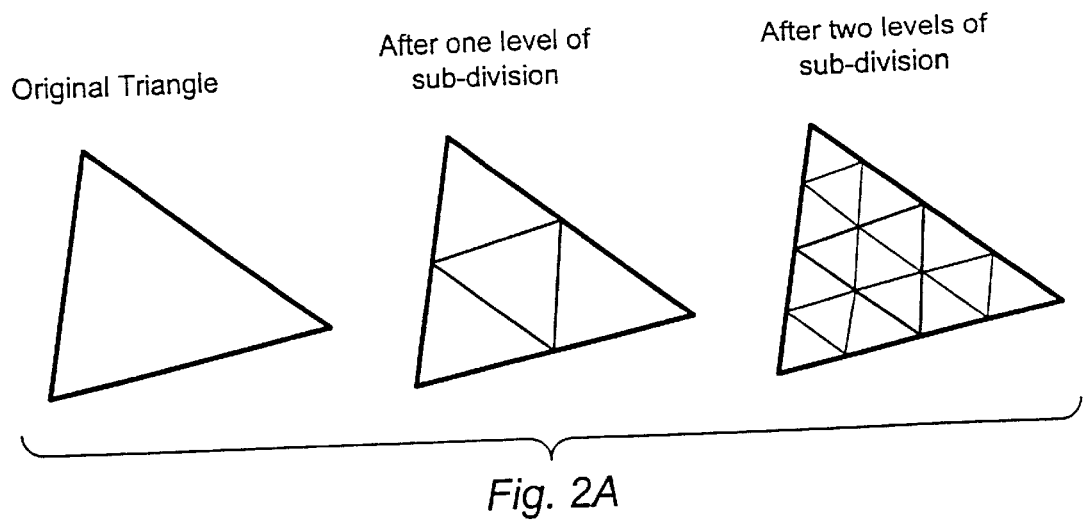
FIG. 2A illustrates one embodiment of a triangle fragmentation process.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Various Spaces

The detailed description that follows may be more easily understood if various spaces are first defined:

Model Space: The space in which an object (or set of objects) is defined.

Virtual World Space: The space in which a scene comprising a collection of objects and light sources may be constructed. Each object may be injected into virtual world space with a transformation that achieves any desired combination of rotation, translation and scaling of the object. In older terminology, virtual world space has often been referred to simply as "world space".

Camera Space: A space defined by a transformation $T^{VC}$ from virtual world space. The transformation $T^{VC}$ may achieve a combination of translation, rotation, and scaling. The translation and rotation account for the current position and orientation of a virtual camera in the virtual world space. The coordinate axes of camera space are rigidly bound to the virtual camera. In OpenGL, camera space is referred to as "eye space".

Clipping Space: A space defined by a transform $T^{CX}$ from camera space before any perspective division by the W coordinate, and is used as an optimization in some clipping algorithms. In clipping space, the sides of the perspective-projection view volume may occur on the bounding planes $X=\pm W$, $Y=\pm W$, $Z=0$ and $Z=-W$. Clipping space is not mandated by the abstract rendering pipeline disclosed herein, and is defined here as a convenience for hardware implementations that choose to employ it.

Image Plate Space: A two-dimensional space with a normalized extent from −1 to 1 in each dimension, created after perspective division by the W coordinate of clipping space, but before any scaling and offsetting to convert coordinates into render pixel space).

Pixel Plate Space: A two-dimensional space created after perspective division by the W coordinate of camera space, but before any scaling and offsetting to convert coordinates into render pixel space.

Render Pixel Space: A space defined by a transform $T^{IR}$ from image plate space (or a transform $T^{JR}$ from pixel plate space). The transform $T^{IR}$ (or $T^{JR}$) scales and offsets points from image plate space (or pixel plate space) to the native space of the rendered samples. See FIGS. 7 and 8.

Video Pixel Space: According to the abstract rendering pipeline defined herein, a filtering engine generates virtual pixel positions in render pixel space (e.g., as suggested by the plus markers of FIG. 8), and may compute a video pixel at each of the virtual pixel positions by filtering samples in the neighborhood of the virtual pixel position. The horizontal displacement $\Delta x$ and vertical displacement $\Delta y$ between virtual pixel positions are dynamically programmable values. Thus, the array of virtual pixel positions is independent of the array of render pixels. The term "video pixel space" is used herein to refer to the space of the video pixels.

Texture Vertex Space: The space of the texture coordinates attached to vertices. Texture vertex space is related to texture image space by the currently active texture transform. (Effectively, every individual geometry object defines its own transform from texture vertex space to model space, by the association of the position, texture coordinates, and possibly texture coordinate derivatives with all the vertices that define the individual geometry object.)

Texture Image Space: This is a space defined by the currently active texture transform. It is the native space of texture map images.

Light Source Space: A space defined by a given light source.

Abstract Rendering Pipeline

FIG. 1 illustrates a rendering pipeline 100 that supports per-pixel programmable shading. The rendering pipeline 100 defines an abstract computational model for the generation of video pixels from primitives. Thus, a wide variety of hardware implementations of the rendering pipeline 100 are contemplated.

Vertex data packets may be accessed from a vertex buffer 105. A vertex data packet may include a position, a normal vector, texture coordinates, texture coordinate derivatives, and a color vector. More generally, the structure of a vertex data packet is user programmable. As used herein the term vector denotes an ordered collection of numbers.

In step 110, vertex positions and vertex normals may be transformed from model space to camera space or virtual world space. For example, the transformation from model space to camera space may be represented by the following expressions:

$$X^C = T^{MC} X^M,$$

$$N^C = G^{MC} n^M.$$

If the normal transformation $G^{MC}$ is not length preserving, the initial camera space vector $N^C$ may be normalized to unit length:

$$n^C = N^C / \text{length}(N^C).$$

For reasons that will become clear shortly, it is useful to maintain both camera space (or virtual world space) position and render pixel space position for vertices at least until after tessellation step 120 is complete. (This maintenance of vertex position data with respect to two different spaces is referred to herein as "dual bookkeeping".) Thus, the camera space position $X^C$ may be further transformed to render pixel space:

$$X^R = T^{CR} X^C.$$

The camera-space-to-render-pixel-space transformation $T^{CR}$ may be a composite transformation including transformations from camera space to clipping space, from clipping space to image plate space (or pixel plate space), and from image plate space (or pixel plate space) to render pixel space.

In step 112, one or more programmable vertex shaders may operate on the camera space (or virtual world space) vertices. The processing algorithm performed by each vertex shader may be programmed by a user. For example, a vertex shader may be programmed to perform a desired spatial transformation on the vertices of a set of objects.

In step 115, vertices may be assembled into primitives (e.g. polygons or curved surfaces) based on connectivity information associated with the vertices. Alternatively, vertices may be assembled into primitives prior to the transformation step 110 or programmable shading step 112.

In step 120, primitives may be tessellated into micropolygons. In one set of embodiments, a polygon may be declared to be a micropolygon if the projection of the polygon in render pixel space satisfies a maximum size constraint. The nature of the maximum size constraint may vary among hardware implementations. For example, in some implementations, a polygon qualifies as a micropolygon when each edge of the polygon's projection in render pixel space has length less than or equal to a length limit $L_{max}$ in render pixel space. The length limit $L_{max}$ may equal one or one-half. More generally, the length limit $L_{max}$ may equal a user-programmable value, e.g., a value in the range [0.5, 2.0].

As used herein the term "tessellate" is meant to be a broad descriptive term for any process (or set of processes) that operates on a geometric primitive to generate micropolygons.

Tessellation may include a triangle fragmentation process that divides a triangle into four subtriangles by injecting three new vertices, i.e., one new vertex at the midpoint of each edge of the triangle as suggested by FIG. 2A. The triangle fragmentation process may be applied recursively to each of the subtriangles. Other triangle fragmentation processes are contemplated. For example, a triangle may be subdivided into six subtriangles by means of three bisecting segments extending from each vertex of the triangle to the midpoint of the opposite edge.

Figure 2B:
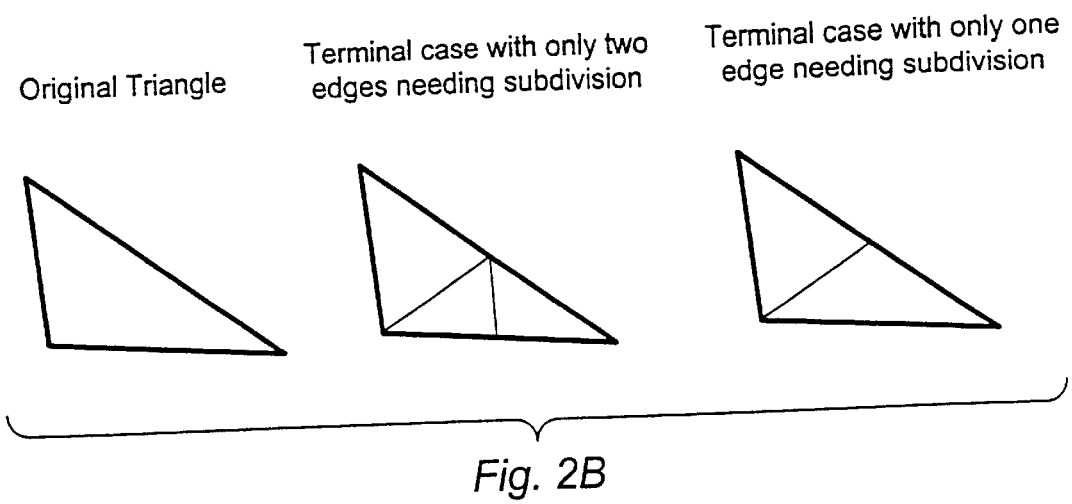
FIG. 2B illustrates several termination criteria for a triangle fragmentation process.

FIG. 2B illustrates means for controlling and terminating a recursive triangle fragmentation. If a triangle resulting from an application of a fragmentation process has all three edges less than or equal to a termination length $L_{term}$, the triangle need not be further fragmented. If a triangle has exactly two edges greater than the termination length $L_{term}$ (as measured in render pixel space), the triangle may be divided into three subtriangles by means of a first segment extending from the midpoint of the longest edge to the opposite vertex, and a second segment extending from said midpoint to the midpoint of the second longest edge. If a triangle has exactly one edge greater than the termination length $L_{term}$, the triangle may be divided into two subtriangles by a segment extending from the midpoint of the longest edge to the opposite vertex.

Figure 3A:
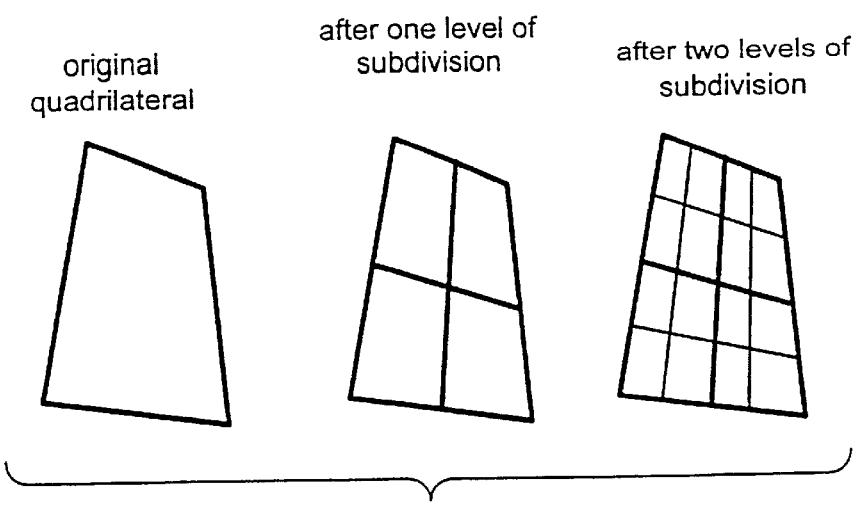
FIG. 3A illustrates one embodiment of a quadrilateral fragmentation process.

Tessellation may also include a quadrilateral fragmentation process that fragments a quadrilateral into four subquadrilaterals by dividing along the two bisectors that each extend from the midpoint of an edge to the midpoint of the opposite edge as illustrated in FIG. 3A. The quadrilateral fragmentation process may be applied recursively to each of the four subquadrilaterals.

Figure 3B:
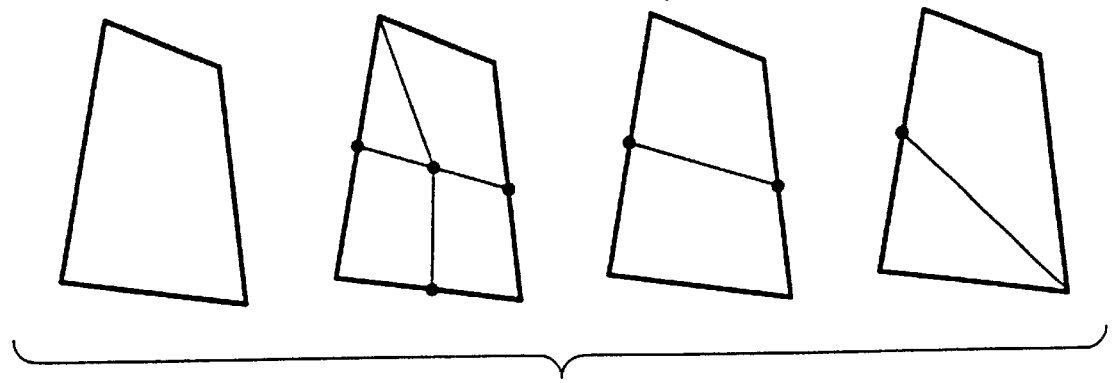
FIG. 3B illustrates several termination criteria for a quadrilateral fragmentation process.

FIG. 3B illustrates means for controlling and terminating a recursive quadrilateral fragmentation. If a quadrilateral resulting from an application of the quadrilateral fragmentation process has all four edges less than or equal to the termination length $L_{term}$, the quadrilateral need not be further fragmented. If the quadrilateral has exactly three edges greater than the termination length $L_{term}$, and the longest and second longest edges are nonadjacent, the quadrilateral may be divided into three subquadrilaterals and a triangle by means of segments extending from an interior point to the midpoints of the three longest edges, and a segment extending from the interior point to the vertex which connects the smallest edge and longest edge. (The interior point may be the intersection of the two lines which each extend from an edge midpoint to the opposite edge midpoint.) If the quadrilateral has exactly two sides greater than the termination length limit $L_{term}$, and the longest edge and the second longest edge are nonadjacent, the quadrilateral may be divided into two subquadrilaterals by means of a segment extending from the midpoint of the longest edge to the midpoint of the second longest edge. If the quadrilateral has exactly one edge greater than the termination length $L_{term}$, the quadrilateral may be divided into a subquadrilateral and a subtriangle by means of a segment extending from the midpoint of the longest edge to the vertex that connects the second longest edge and the third longest edge. The cases given in FIG. 3B are not meant be an exhaustive list of termination criteria.

Figure 4:
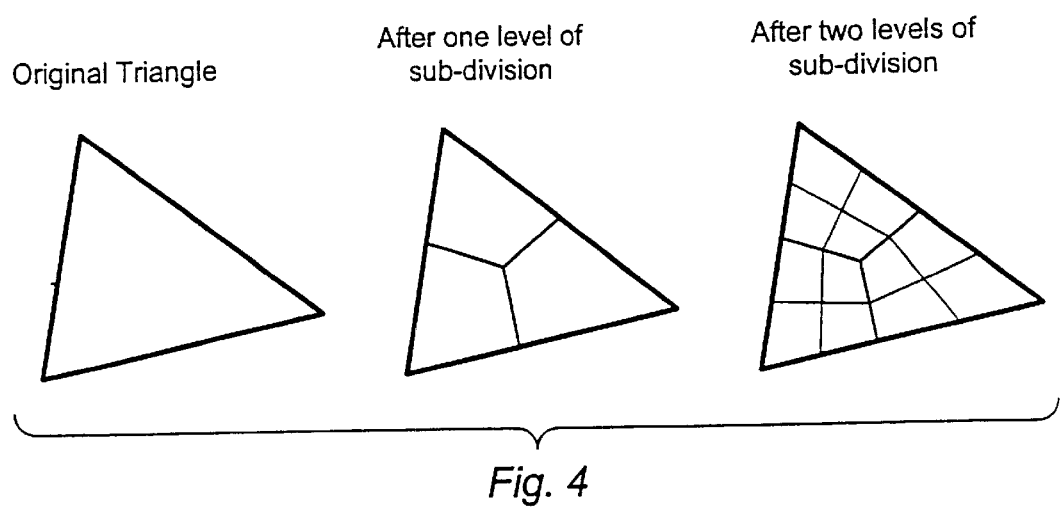
FIG. 4 illustrates one embodiment of a fragmentation process that operates on triangles to generate component quadrilaterals.

In some embodiments, tessellation may include algorithms that divide one type of primitive into components of another type. For example, as illustrated in FIG. 4, a triangle may be divided into three subquadrilaterals by means of segments extending from an interior point (e.g. the triangle centroid) to the midpoint of each edge. (Once the triangle has been the divided into subquadrilaterals, a quadrilateral fragmentation process may be applied recursively to the subquadrilaterals.) As another example, a quadrilateral may be divided into four subtriangles by means of two diagonals that each extend from a vertex of the quadrilateral to the opposite vertex.

Figure 5A:
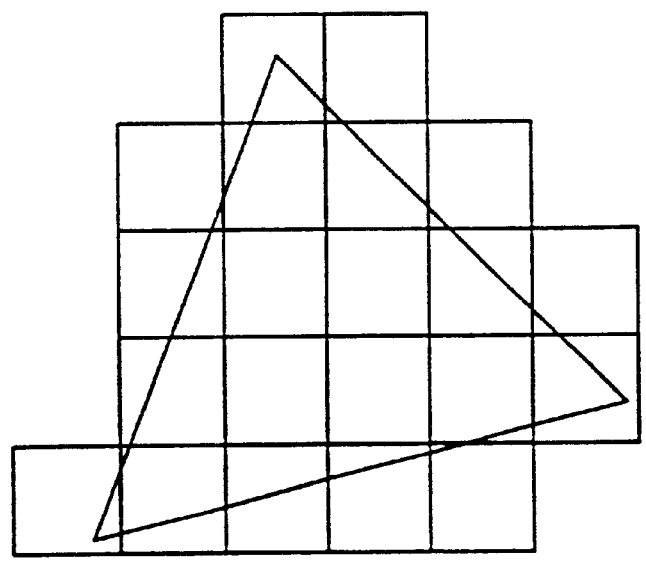
FIGS. 5A and 5B illustrate one embodiment of a method for fragmenting a primitive based on render pixels.
Figure 5B:
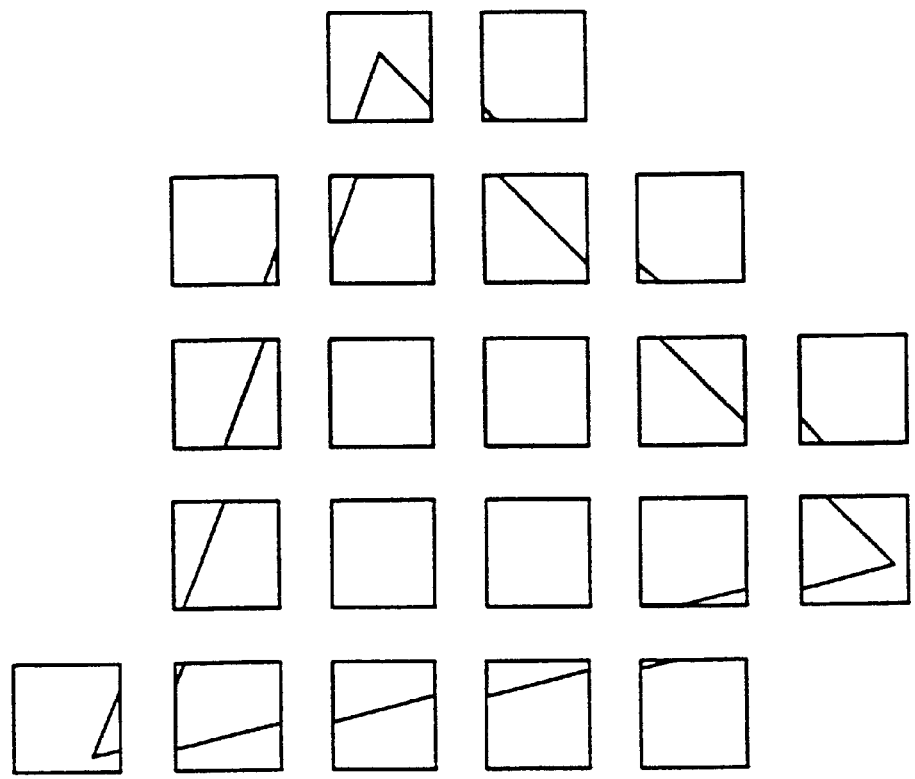

In some embodiments, tessellation may involve the fragmentation of primitives into micropolygons based on an array of render pixels as suggested by FIGS. 5A and 5B. FIG. 5A depicts a triangular primitive as seen in render pixel space. The squares represent render pixels in render pixel space. Thus, the primitive intersects 21 render pixels. Seventeen of these render pixels are cut by one or more edges of the primitive, and four are completely covered by the primitive. A render pixel that is cut by one or more edges of the primitive is referred to herein as a trimmed render pixel (or simply, trimmed pixel). A render pixel that is completely covered by the primitive is referred to herein as a microsquare.

The tessellation process may compute edge-trimming information for each render pixel that intersects a primitive. In one implementation, the tessellation process may compute a slope for an edge of a primitive and an accept bit indicating the side of the edge that contains the interior of the primitive, and then, for each render pixel that intersects the edge, the tessellation process may append to the render pixel (a) the edge's slope, (b) the edge's intercept with the boundary of the render pixel, and (c) the edge's accept bit. The edge-trimming information is used to perform sample fill (described somewhat later).

FIG. 5B illustrates an exploded view of the 21 render pixels intersected by the triangular primitive. Observe that of the seventeen trimmed render pixels, four are trimmed by two primitive edges, and the remaining thirteen are trimmed by only one primitive edge.

In some embodiments, tessellation may involve the use of different fragmentation processes at different levels of scale. For example, a first-fragmentation process (or a first set of fragmentation processes) may have a first termination length that is larger than the length limit $L_{max}$. A second fragmentation process (or a second set of fragmentation processes) may have a second termination length that is equal to the length limit $L_{max}$. The first fragmentation process may receive arbitrary sized primitives and break them down into intermediate size polygons (i.e. polygons that have maximum side length less than or equal to the first termination length). The second fragmentation process takes the intermediate size polygons and breaks them down into micropolygons (i.e., polygons that have maximum side length less than or equal to the length limit $L_{max}$).

The rendering pipeline 100 may also support curved surface primitives. The term "curved surface primitive" covers a large number of different non-planar surface patch descriptions, including quadric and Bezier patches, NURBS, and various formulations of sub-division surfaces. Thus, tessellation step 120 may include a set of fragmentation processes that are specifically configured to handle curved surfaces of various kinds.

Given an edge (e.g. the edge of a polygon) defined by the vertices $V_1$ and $V_2$ in camera space, the length of the edge's projection in render pixel space may be computed according to the relation $\|v_2-v_1\|$, where $v_1$ and $v_2$ are the projections of $V_1$ and $V_2$ respectively into render pixel space, where $\|*\|$ denotes a vector norm such as the $L^1$ norm, the $L^\infty$ norm, or Euclidean norm, or, an approximation to a vector norm. The $L^1$ norm of a vector is the sum of the absolute values of the vector components. The $L^\infty$ norm of a vector is the maximum of the absolute values of the vector components. The Euclidean norm of a vector is the square root of the sum of the squares of the vector components.

In some implementations, primitives may be tessellated into "microquads", i.e., micropolygons with at most four edges. In other implementations, primitives may be tessellated into microtriangles, i.e., micropolygons with exactly three edges. More generally, for any integer $N_S$ greater than or equal to three, a hardware system may be implemented to subdivide primitives into micropolygons with at most $N_S$ sides.

Figure 6:
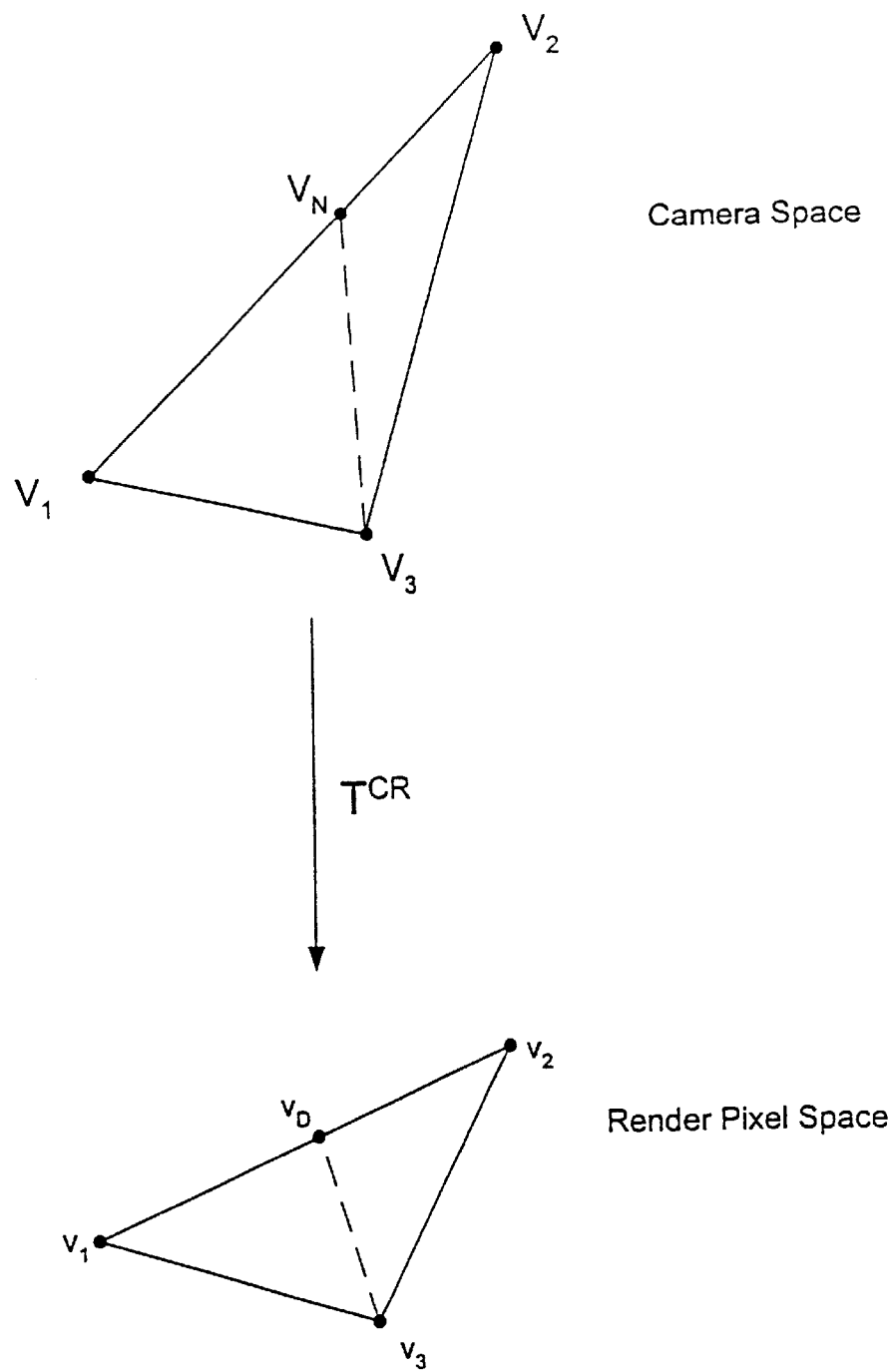
FIG. 6 illustrates a triangle in camera space and its projection into render pixel space.

The tessellation process may involve computations both in camera space and render pixel space as suggested by FIG. 6. A triangle in camera space defined by the vertices $V_1$, $V_2$ and $V_3$ projects onto a triangle in render pixel space defined by the vertices $v_1$, $v_2$ and $v_3$ respectively, i.e., $v_k=T^{CR}V_k$ for $k=1, 2, 3$. If a new vertex $V_N$ is injected along the edge from $V_1$ to $V_2$, two new subtriangles, having as their common edge the line segment from $V_N$ to $V_3$, may be generated.

Because the goal of the tessellation process is to arrive at component pieces which are sufficiently small as seen in render pixel space, the tessellation process may initially specify a scalar value $\sigma^R$ which defines a desired location $v_D$ along the screen space edge from v1 to v2 according to the relation $v_D=(1-\sigma^R)*v_1+\sigma^R*v_2$. (For example, one of the fragmentation processes may aim at dividing the screen space edge from v1 to v2 at its midpoint. Thus, such a fragmentation process may specify the value $\sigma^R=0.5$.) Instead of computing $v_D$ directly and then applying the inverse mapping $(T^{CR})^{-1}$ to determine the corresponding camera space point, the scalar value $\sigma^R$ may then be used to compute a scalar value $\sigma^C$ with the property that the projection of the camera space position:

$$V_N=(1-\sigma^C)*V_1+\sigma^C*V_2$$

into render pixel space equals (or closely approximates) the screen space point $v_D$. The scalar value $\sigma^C$ may be computed according to the formula:

$$\sigma^C = \left(\frac{1}{W_2 - W_1}\right)\left(\frac{1}{\frac{1}{W_1} + \sigma^R \cdot \left(\frac{1}{W_2} - \frac{1}{W_1}\right)} - W_1\right),$$

where $W_1$ and $W_2$ are the W coordinates of camera space vertices $V_1$ and $V_2$ respectively. The scalar value $\sigma^C$ may then be used to compute the camera space position $V_N=(1-\sigma^C)*V_1+\sigma^C*V_2$ for the new vertex. Note that $\sigma^C$ is not generally equal to $\sigma^R$ since the mapping $T^{CR}$ is generally not linear. (The vertices $V_1$ and $V_2$ may have different values for the W coordinate.)

As illustrated above, tessellation includes the injection of new vertices along the edges of primitives and in the interior of primitives. Data components (such as color, surface normal, texture coordinates, texture coordinate derivatives, transparency, etc.) for new vertices injected along an edge may be interpolated from the corresponding data components associated with the edge endpoints. Data components for new vertices injecting in the interior of a primitive may be interpolated from the corresponding data components associated with the vertices of the primitive.

In step 122, a programmable displacement shader (or a set of programmable displacement shaders) may operate on the vertices of the micropolygons. A user may program the processing algorithm(s) implemented by the displacement shader(s). The displacement shader(s) move the vertices in camera space. Thus, the micropolygons may be perturbed into polygons that no longer qualify as micropolygons (because their size as viewed in render pixel space has increased beyond the maximum size constraint). For example, the vertices of a microtriangle which is facing almost "on edge" to the virtual camera may be displaced in camera space so that the resulting triangle has a significantly larger projected area or diameter in render pixel space. Therefore, the polygons resulting from the displacement shading may be fed back to step 120 for tessellation into micropolygons. The new micropolygons generated by tessellation step 120 may be forwarded to step 122 for another wave of displacement shading or to step 125 for surface shading and light shading.

In step 125, a set of programmable surface shaders and/or programmable light source shaders may operate on the vertices of the micropolygons. The processing algorithm performed by each of the surface shaders and light source shaders may be programmed by a user. After any desired programmable surface shading and lighting have been performed on the vertices of the micropolygons, the micropolygons may be forwarded to step 130.

Figure 7:
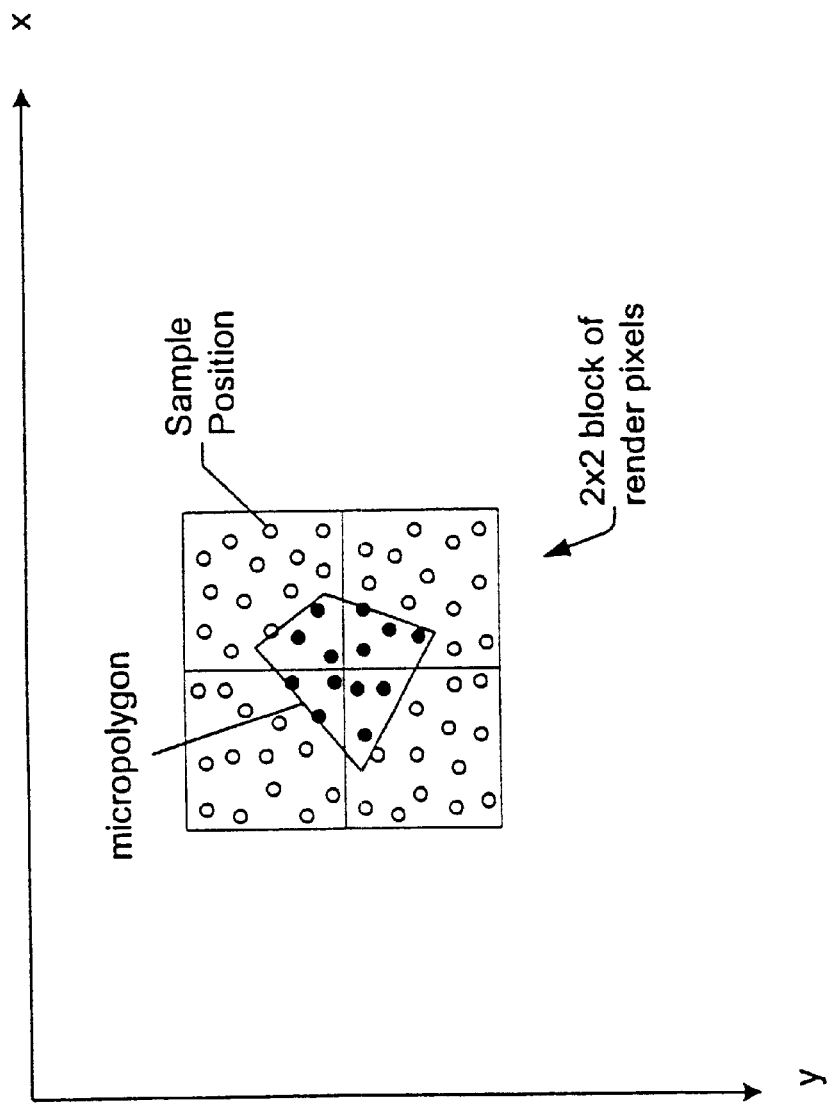
FIG. 7 illustrates a process for filling a micropolygon with samples.

In step 130, a sample fill operation is performed on the micropolygons as suggested by FIG. 7. A sample generator may generate a set of sample positions for each render pixel that has a nonempty intersection with the micropolygon. The sample positions that reside interior to the micropolygon may be identified as such. A sample may then be assigned to each interior sample position in the micropolygon. The contents of a sample may be user defined. Typically, the sample includes a color vector (e.g., an RGB vector) and a depth value (e.g., a z value or a 1/W value).

The algorithm for assigning samples to the interior sample positions may vary from one hardware implementation to the next. For example, according to a "flat fill" algorithm, each interior sample position of the micropolygon may be assigned the color vector and depth value of a selected one of the micropolygon vertices. The selected micropolygon vertex may be the vertex which has the smallest value for the sum x+y, where x and y are the render pixel space coordinates for the vertex. If two vertices have the same value for x+y, then the vertex that has the smaller y coordinate, or alternatively, x coordinate, may be selected. Alternatively, each interior sample position of the micropolygon may be assigned the color vector and depth value of the closest vertex of the micropolygon vertices.

According to an "interpolated fill" algorithm, the color vector and depth value assigned to an interior sample position may be interpolated from the color vectors and depth values already assigned to the vertices of the micropolygon.

According to a "flat color and interpolated z" algorithm, each interior sample position may be assigned a color vector based on the flat fill algorithm and a depth value based on the interpolated fill algorithm.

The samples generated for the interior sample positions are stored into a sample buffer 140. Sample buffer 140 may store samples in a double-buffered fashion (or, more generally, in an multi-buffered fashion where the number N of buffer segments is greater than or equal to two). In step 145, the samples are read from the sample buffer 140 and filtered to generate video pixels.

Figure 8:
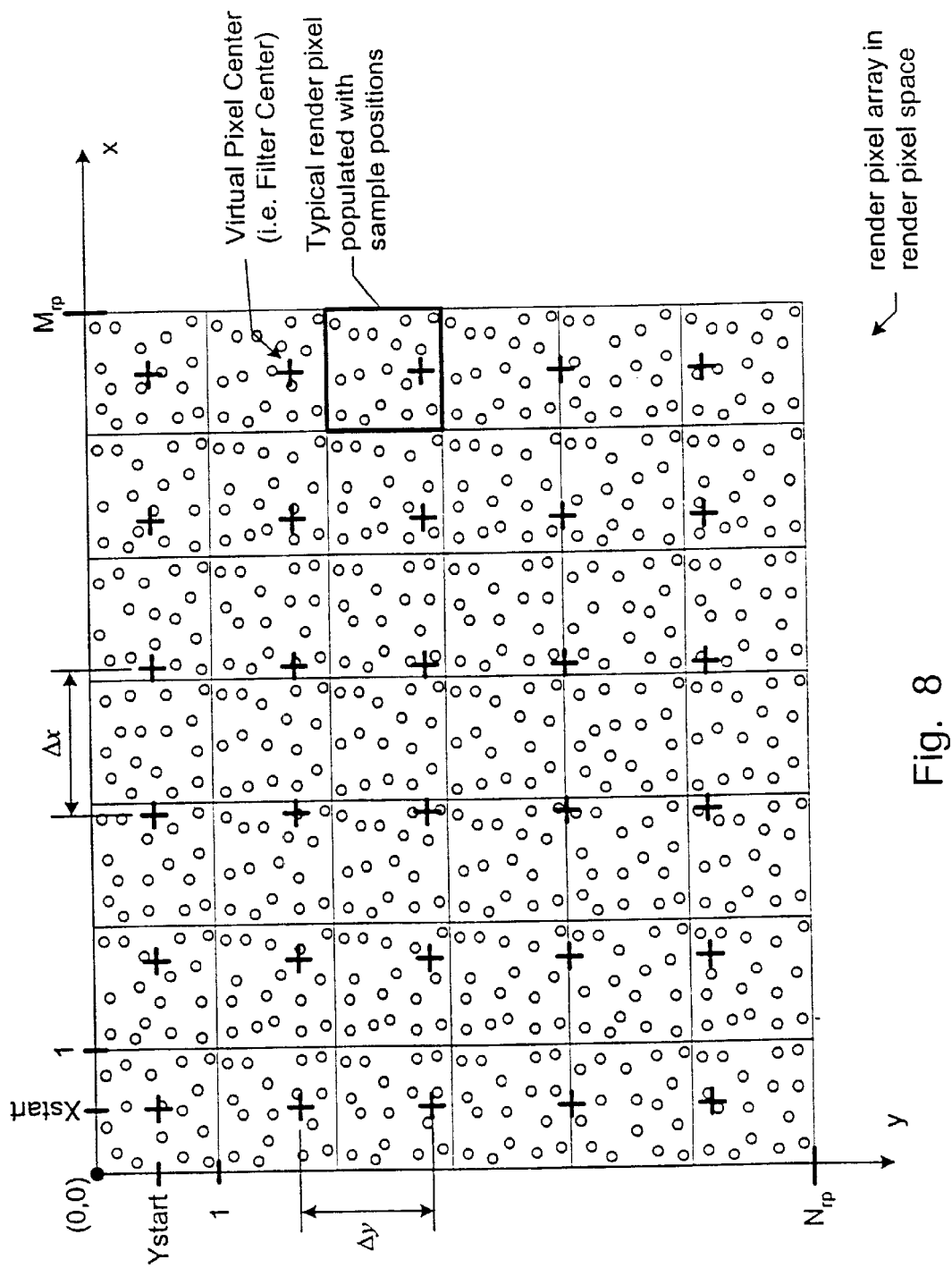
FIG. 8 illustrates an array of virtual pixel positions superimposed on an array of render pixels in render pixel space.

The rendering pipeline 100 may be configured to render primitives for an $M_{rp} \times N_{rp}$ array of render pixels in render pixel space as suggested by FIG. 8. Each render pixel may be populated with $N_{sd}$ sample positions. The values $M_{rp}$, $N_{rp}$ and $N_{sd}$ are user-programmable parameters. The values $M_{rp}$ and $N_{rp}$ may take any of a wide variety of values, especially those characteristic of common video formats.

The sample density $N_{sd}$ may take any of a variety of values, e.g., values in the range from 1 to 16 inclusive. More generally, the sample density $N_{sd}$ may take values in the interval $[1, M_{sd}]$, where $M_{sd}$ is a positive integer. It may be convenient for $M_{sd}$ to equal a power of two such as 16, 32, 64, etc. However, powers of two are not required.

The storage of samples in the sample buffer 140 may be organized according to memory bins. Each memory bin corresponds to one of the render pixels of the render pixel array, and stores the samples corresponding to the sample positions of that render pixel.

The filtering process may scan through render pixel space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position $(X_{start}, Y_{start})$. The horizontal displacement $\Delta X$, vertical displacement $\Delta Y$ and the start coordinates $X_{start}$ and $Y_{start}$ are programmable parameters. Thus, the size of the render pixel array may be different from the size of the video pixel array.

Figure 9:
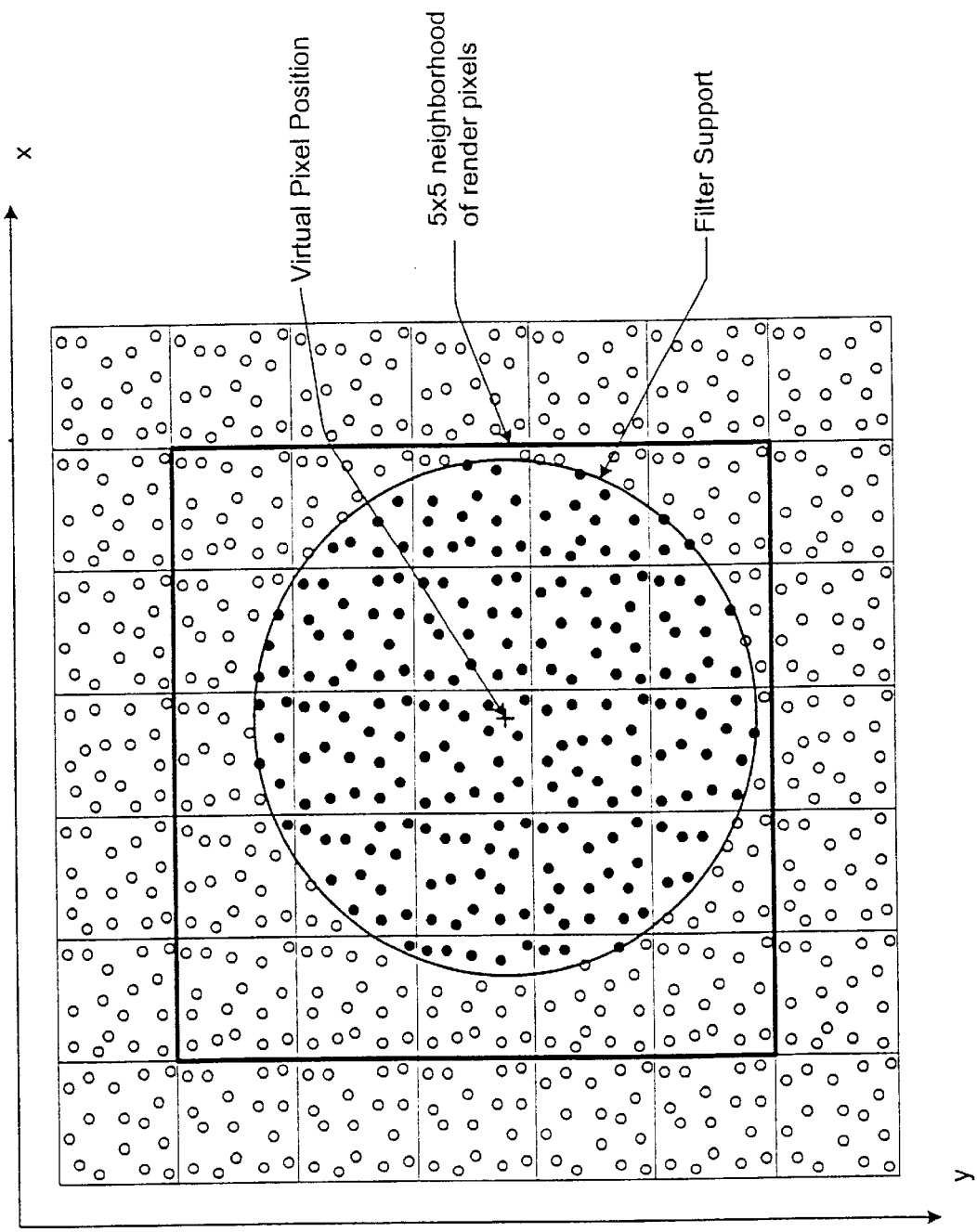
FIG. 9 illustrates the computation of a pixel at a virtual pixel position (denoted by the plus marker) according to one set of embodiments.

The filtering process may compute a video pixel at a particular virtual pixel position as suggested by FIG. 9. The filtering process may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering process may compute an initial red value $r_p$ for the video pixel P according to the expression:

$$r_p = \Sigma C_S r_S,$$

where the summation ranges over each sample S in the filter support region, and where $r_S$ is the red color component of the sample S. In other words, the filtering process may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering process may compute a normalization value E by adding up the filter coefficients $C_S$ for the samples S in the filter support region, i.e., $$E = \Sigma C_S.$$

The initial pixel values may then be multiplied by the reciprocal of E (or equivalently, divided by E) to determine normalized pixel values:

$R_P = (1/E) * r_P$ $G_P = (1/E) * g_P$ $B_P = (1/E) * b_P$ $A_P = (1/E) * a_P$

The filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in render pixel space on which the filter is defined. The terms "filter" and "kernel" are used as synonyms herein. Let $R_f$ denote the radius of the circular support disk.

Figure 10:
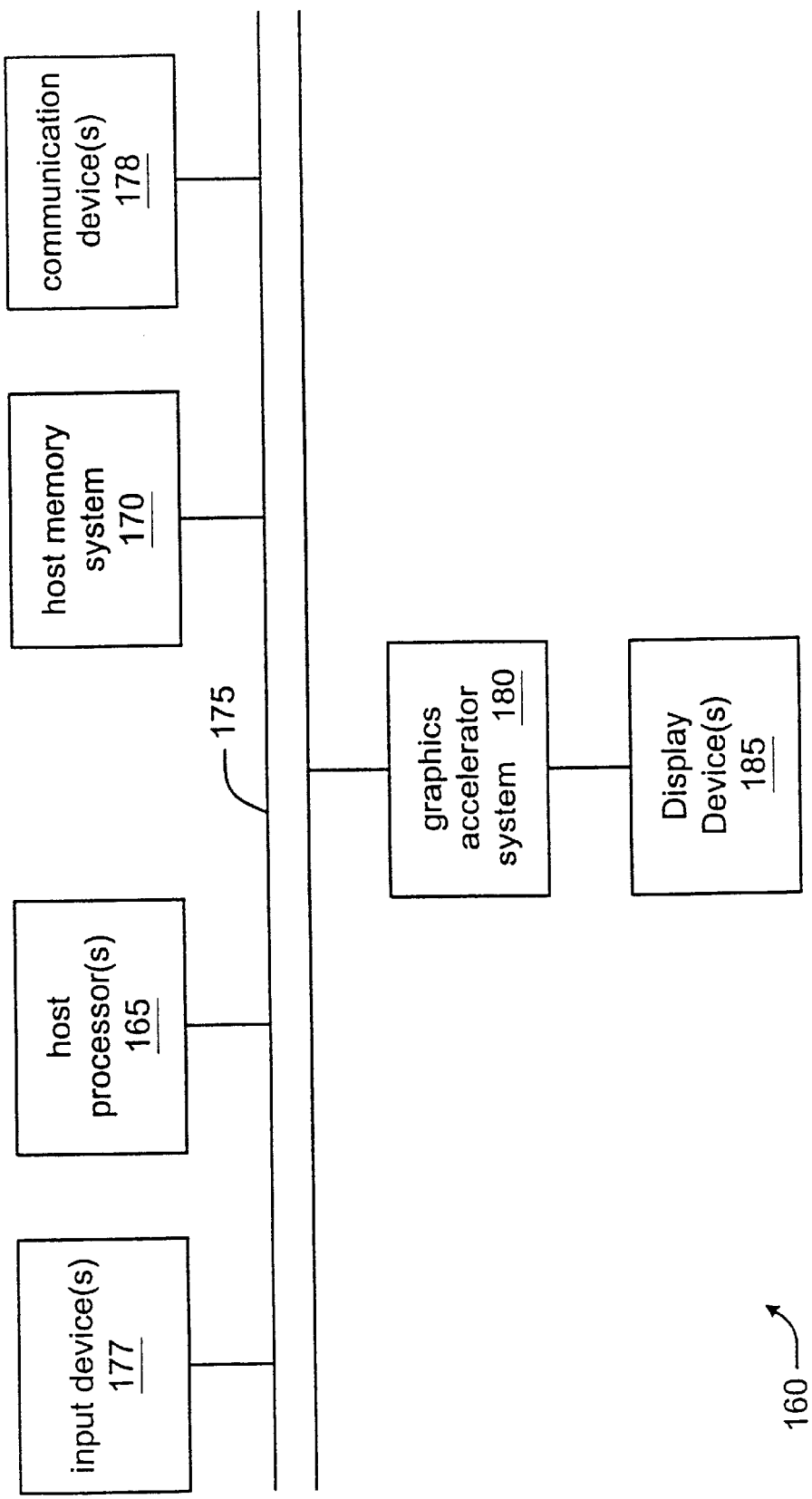
FIG. 10 illustrates one set of embodiments of computational system configured to perform graphical rendering computations.

FIG. 10 illustrates one set of embodiments of a computational system 160 operable to perform graphics rendering computations. Computational system 160 includes a set of one or more host processors 165, a host memory system 170, a set of one or more input devices 177, a graphics accelerator system 180 (also referred to herein as a graphics accelerator), and a set of one or more display devices 185. Host processor(s) 165 may couple to the host memory system 170 and graphics system 180 through a communication medium such as communication bus 175, or perhaps, through a computer network.

Host memory system 170 may include any desired set of memory devices, e.g., devices such as semiconductor RAM and/or ROM, CD-ROM drives, magnetic disk drives, magnetic tape drives, bubble memory, etc. Input device(s) 177 include any of a variety of devices for supplying user input, i.e., devices such as a keyboard, mouse, track ball, head position and/or orientation sensors, eye orientation sensors, data glove, light pen, joystick, game control console, etc. Computational system 160 may also include a set of one or more communication devices 178. For example, communication device(s) 178 may include a network interface card for communication with a computer network.

Graphics system 180 may be configured to implement the graphics computations associated with rendering pipeline 100. Graphics system 180 generates a set of one or more video signals (and/or digital video streams) in response to graphics data received from the host processor(s) 165 and/or the host memory system 170. The video signals (and/or digital video streams) are supplied as outputs for the display device(s) 185.

In one embodiment, the host processor(s) 165 and host memory system 170 may reside on the motherboard of a personal computer (or personal workstation). Graphics system 180 may be configured for coupling to the motherboard.

Figure 11:
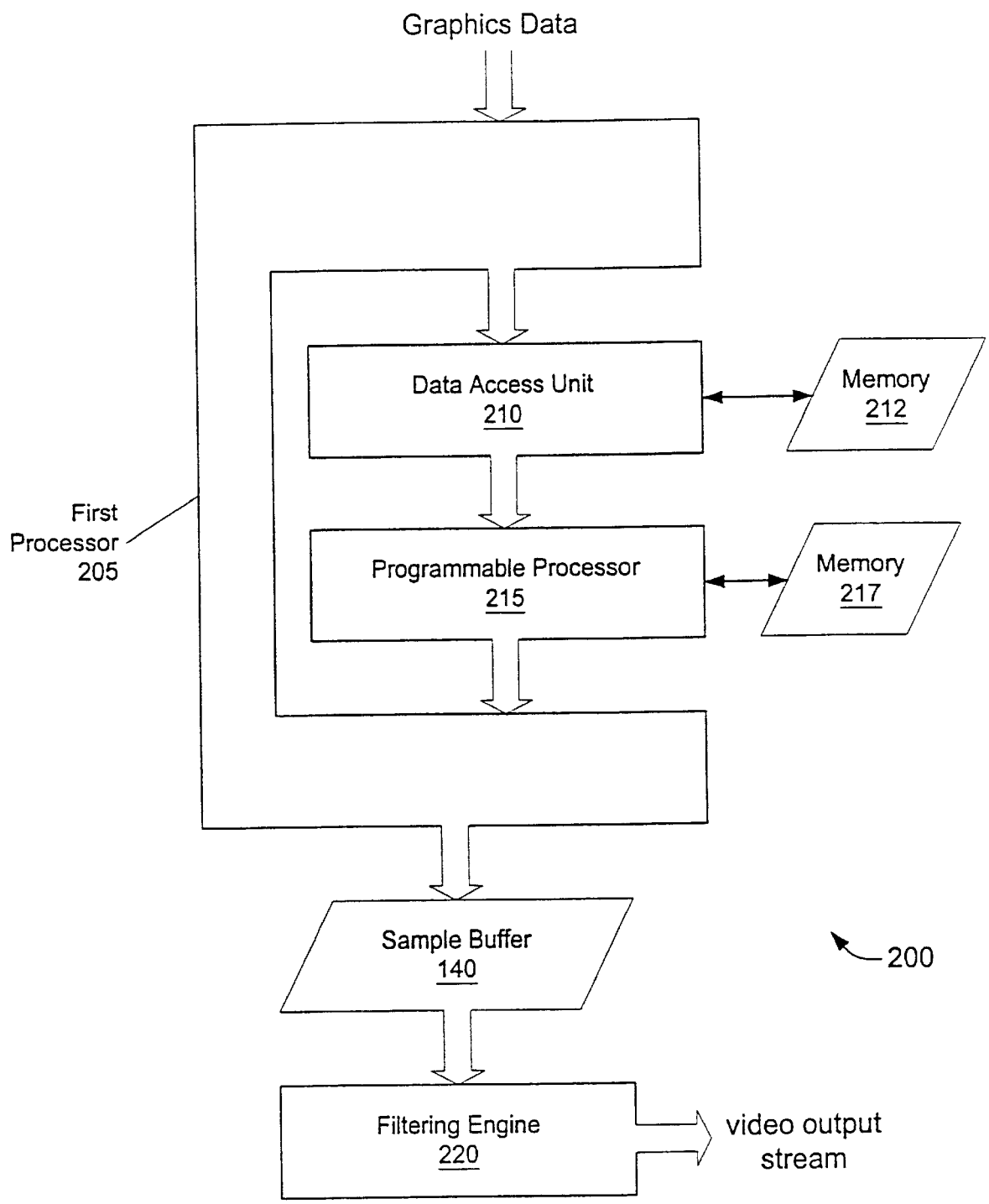
FIG. 11 illustrates one embodiment of a graphics system configured to perform per pixel programmable shading.

The rendering pipeline 100 may be implemented in hardware in a wide variety of ways. For example, FIG. 11 illustrates one embodiment of a graphics system 200 that implements the rendering pipeline 100. Graphics system 200 includes a first processor 205, a data access unit 210, programmable processor 215, sample buffer 140 and filtering engine 220. The first processor 205 may implement steps 110, 112, 115, 120 and 130 of the rendering pipeline 100. Thus, the first processor 205 may receive a stream of graphics data from a graphics processor, pass micropolygons to data access unit 210, receive shaded micropolygons from the programmable processor 215, and transfer samples to sample buffer 140. In one set of embodiments, graphics system 200 may serve as graphics accelerator system 180 in computational system 160.

The programmable processor 215 implements steps 122 and 125, i.e., performs programmable displacement shading, programmable surface shading and programmable light source shading. The programmable shaders may be stored in memory 217. A host computer (coupled to the graphics system 200) may download the programmable shaders to memory 217. Memory 217 may also store data structures and/or parameters that are used and/or accessed by the programmable shaders. The programmable processor 215 may include one or more microprocessor units that are configured to execute arbitrary code stored in memory 217.

Data access unit 210 may be optimized to access data values from memory 212 and to perform filtering operations (such as linear, bilinear, trilinear, cubic or bicubic filtering) on the data values. Memory 212 may be used to store map information such as bump maps, displacement maps, surface texture maps, shadow maps, environment maps, etc. Data access unit 210 may provide filtered and/or unfiltered data values (from memory 212) to programmable processor 215 to support the programmable shading of micropolygon vertices in the programmable processor 215.

Data access unit 210 may include circuitry to perform texture transformations. Data access unit 210 may perform a texture transformation on the texture coordinates associated with a micropolygon vertex. Furthermore, data access unit 210 may include circuitry to estimate a mip map level $\lambda$ from texture coordinate derivative information. The result of the texture transformation and the MML estimation may be used to compute a set of access addresses in memory 212. Data access unit 210 may read the data values corresponding to the access addresses from memory 212, and filter the data values to determine a filtered value for the micropolygon vertex. The filtered value may be bundled with the micropolygon vertex and forwarded to programmable processor 215. Thus, the programmable shaders may use filtered map information to operate on vertex positions, normals and/or colors, if the user so desires.

Filtering engine 220 implements step 145 of the rendering pipeline 100. In other words, filtering engine 220 reads samples from sample buffer 140 and filters the samples to generate video pixels. The video pixels may be supplied to a video output port in order to drive a display device such as a monitor, a projector or a head-mounted display.

Method for Supporting Multi-Layer Transparency

A method for generating graphics images from 3-dimensional graphics data representing one or more transparent objects and one or more opaque objects may be achieved by reducing the number of opaque samples stored in sample memory per pixel and storing transparent samples in the memory locations formerly used to store the discarded opaque samples. A plurality of opaque samples for a plurality of sample positions may be initially stored in a sample memory (or in a sample buffer, such as sample buffer 140), where the plurality of sample positions correspond to a pixel, and where the plurality of opaque samples correspond to at least one opaque object. A transparent sample rendered for one of the plurality of sample positions may replace an opaque sample corresponding to another one of the sample positions of the plurality of sample positions.

In some embodiments, this method for generating graphics images from 3-dimensional graphics data may include receiving a plurality of graphics primitives representing one or more transparent objects and one or more opaque objects, rendering the graphics primitives to generate samples, storing the rendered samples in a sample buffer (where an opaque sample stored in the sample buffer may have one or more corresponding transparent samples rendered for the same sample position), blending the transparent and opaque samples rendered for the same position, filtering the blended samples at least once per screen refresh cycle to generate output pixels, and providing the output pixels to a display device. In various embodiments, the output pixels are generated as needed and transmitted to the display device without buffering of frames.

Figure 12A:
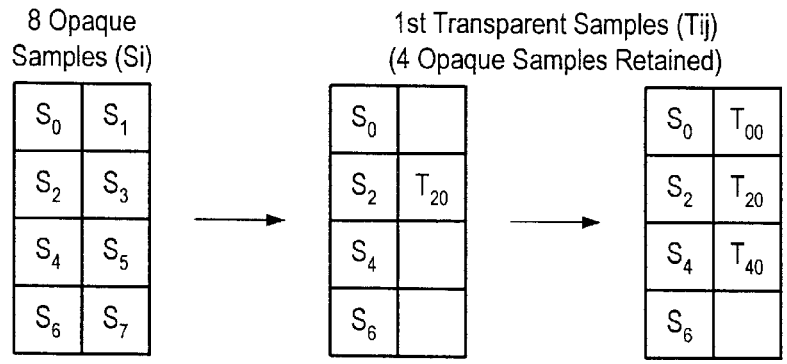
FIGS. 12A, 12B, and 12C illustrate a method of utilizing memory locations that may enable multi-layer transparency.
Figure 12B:
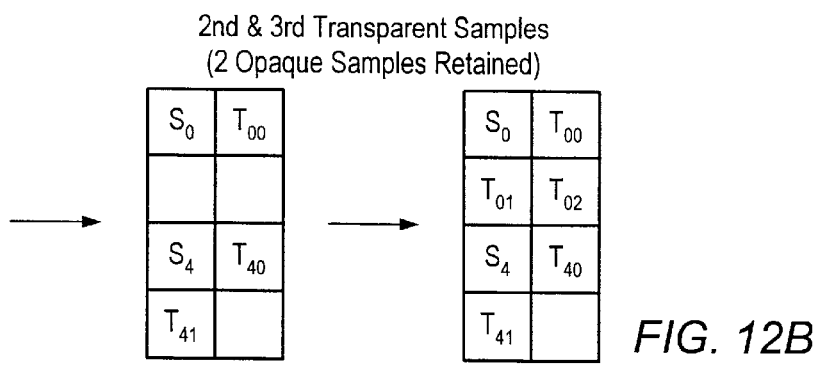
Figure 12C:
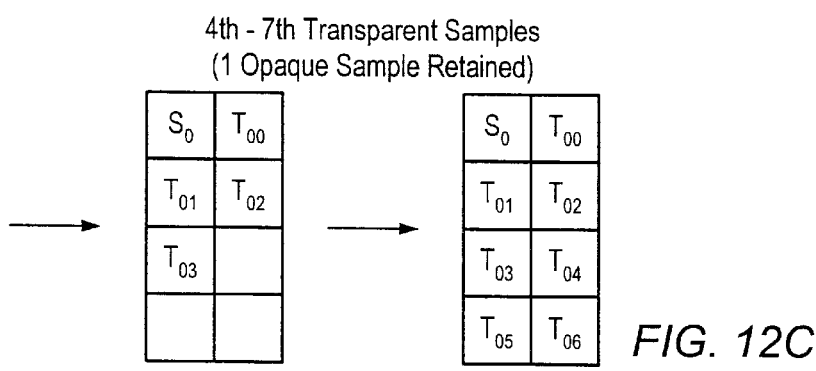

One set of embodiments of this method for supporting multi-layer transparency in a super-sampled 3-dimensional graphics system may be conceptually illustrated in FIGS. 12A, 12B, & 12C. In these illustrations, sample density $N_{sd}$ is set to 8 samples per pixel, however, other sample densities are possible and may be selected by a user. FIG. 12A shows an array of 8 opaque samples rendered for one or more opaque objects and stored in 8 memory locations corresponding to 8 sample positions in the screen space (i.e., render pixel space) corresponding to a pixel (i.e., a render pixel). To add a first transparent sample to this array, half of the opaque samples may be discarded ($S_1$, $S_3$, $S_5$, & $S_7$) to free up 4 memory locations. A first transparent sample, rendered for any one of the sample positions 0, 2, 4, or 6, may then be stored in the next memory location. For instance, the first occurrence of a transparent sample may be for sample position 2. In this case, transparent sample $T_{20}$ may be stored in the memory location that previously held opaque sample $S_3$. Three additional first transparent samples, $T_{00}$, $T_{40}$, and $T_{60}$ rendered for sample positions 0, 4, and 6, may also be stored in the memory locations that previously held $S_1$, $S_5$, and $S_7$.

FIG. 12B illustrates the method for storing a second transparent sample rendered for either sample position 0 or 4. In this case two additional opaque samples $S_2$ and $S_6$ and any corresponding transparent samples may be discarded to free memory spaces for a second and a third transparent sample for each of the two remaining sample positions 0 and 4 corresponding to opaque samples $S_0$ and $S_4$.

FIG. 12C illustrates the method used to store a $4^{th}$ through $7^{th}$ transparent sample rendered for sample position 0. In this case, opaque sample $S_4$ and any corresponding transparent samples may be discarded to free memory spaces for the fourth, fifth, sixth, & seventh transparent samples for the one remaining sample position 0.

Memory locations for storing transparent samples, therefore, may be provided by reducing the number of opaque samples per pixel by a factor of 2, one or more times. Other sample densities of more or less than 8 samples per pixel are possible and contemplated. Some sample densities may involve modifications to the method such as reductions by a factor not equal to 2 when the sample density $N_{sd}$ is not a multiple of 4.

In some embodiments, opaque and transparent samples are tagged and allowed to vary in number for different sample positions. This may maintain high sample density in regions with no transparent objects, half the sample density in regions with one transparent object, and lowest sample density in regions with multiple overlapping transparent objects. In other embodiments, the processing of transparent samples may be limited to a specified portion of the frame corresponding to a specified portion of the image that contains transparent objects.

Transparent samples may be processed and pixels generated at a rate to support a real time video output.

Figure 13:
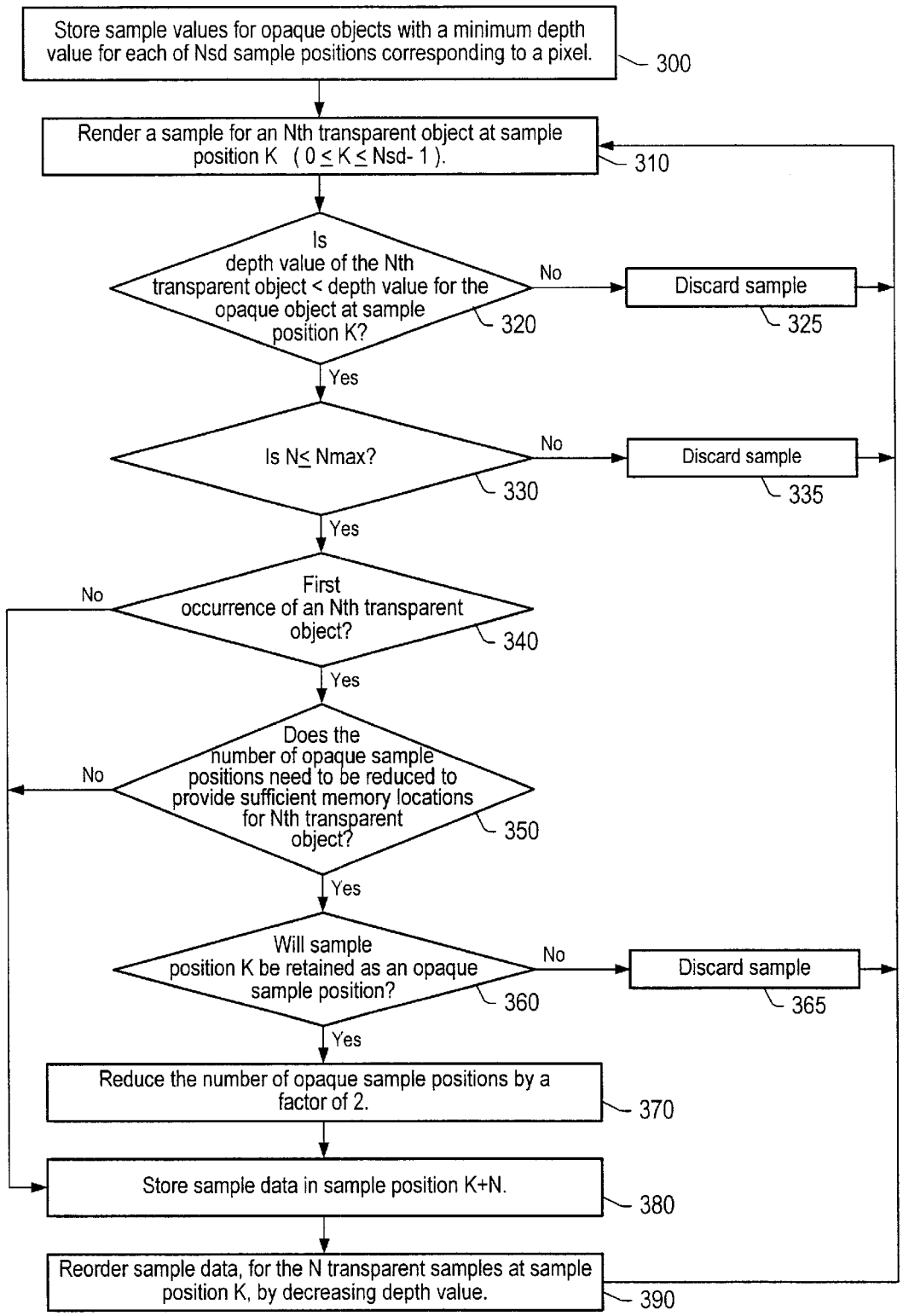
FIG. 13 provides a flow chart of a set of embodiments of a method that may enable multi-layer transparency.

One set of embodiments of a graphics method capable of rendering transparent and opaque 3-dimensional objects may be illustrated by the flow chart in FIG. 13. The method may include:

a) storing sample values, for opaque objects with a minimum depth value for each set of $N_{sd}$ sample positions (or sample locations) corresponding to a pixel, in memory locations corresponding to the $N_{sd}$ sample positions (step 300);

b) rendering a sample for an Nth transparent object at sample position K, where K and N are non-negative integers less than $N_{sd}$ (step 310);

c) discarding the transparent sample if the depth value is greater than the depth value for the opaque sample at sample position K (steps 320 & 325) and processing the next transparent sample rendered (steps 310 through 380);

d) discarding the sample if N is greater than a specified Nmax (steps 330 & 335) and processing the next transparent sample rendered (steps 310 through 380);

e) storing the sample in sample position K+N if it is not the first occurrence of an Nth transparent object (steps 340 & 380);

f) determining if the number of opaque sample positions needs to be reduced to provide a memory location for the sample, if it is a first occurrence of an Nth transparent object (steps 340 & 350);

g) storing the sample in sample position K+N, if the number of opaque sample positions does not need to be reduced to provide a memory location for the sample (steps 350 & 380);

h) discarding the sample, if the number of opaque sample positions needs to be reduced, but sample position K would not be retained in the reduction (steps 350, 360, & 365) and processing the next transparent sample rendered (steps 310 through 380);

i) reducing the number of opaque sample positions by a selected factor (2 when $N_{sd}$ is a multiple of 4), if the number of opaque sample positions needs to be reduced and sample position K will be retained in the reduction (steps 350, 360, & 370) and store the sample in sample position K+N (step 380); and j) processing the next transparent sample rendered (steps 310 through 380).

Storing sample values for opaque objects with a minimum depth value may include performing a depth value comparison between a new opaque sample for a sample position and the previously stored opaque sample, and storing the new opaque sample if the depth value of the new opaque sample is less than the previously stored sample. A depth comparison may also be performed between multiple transparent samples to order the transparent samples by decreasing depth values. In some embodiments, the N transparent samples at sample position K may be read from memory, and restored in order of decreasing depth value (step 390) in the block of N memory locations previously occupied by the transparent samples prior to sorting. In other embodiments, the transparent samples may be stored in the order rendered, and when further processed, reordered as needed. The memory location corresponding to the first sample position in the plurality of sample positions corresponding to a pixel may contain a sample for an opaque object.

Many of the samples rendered for transparent objects may be discarded. A first transparent sample rendered for an odd numbered sample position may be discarded. A transparent sample rendered at a specific sample position that has a depth value greater than the depth value of the opaque sample rendered at the same position may be discarded. A first occurrence of an Nth transparent sample rendered at a specific sample position may be discarded if the opaque sample for the sample position would be discarded to provide memory locations needed to store the Nth transparent sample. An Nth transparent sample may be discarded if N is greater than a specified Nmax.

For the first occurrence of a non-discarded Nth transparent sample, the number of opaque samples may need to be reduced for Ni=1, 2, 4, 8, . . . , $2^i$ (for i=a non-negative integer) and may not need to be reduced when N equals other positive integers. In general, the opaque samples may be reduced by a factor of 2 for each qualifying first occurrence, but for some values of $N_{sd}$ (number of samples per pixel), reductions by a factor not equal to 2 may be selected. When $N_{sd}$ is a multiple of 4, a first occurrence of a second transparent sample (visible to a viewer and with sample position number 4*J) initiates a reduction of the number of opaque sample positions available per pixel by a second factor of 2 (J is a non-negative integer). In some embodiments, the reduction of opaque samples (to provide memory locations for transparent samples) may vary by pixel. In other embodiments, the reduction of opaque samples may be uniform across a region. In still other embodiments, the reduction of opaque samples may be uniform across a frame.

A first transparent sample rendered for one of the even numbered sample positions in the plurality of sample positions corresponding to a pixel may be stored in the memory location corresponding to the next odd numbered sample position. When the number of samples per pixel is a multiple of 4, a second transparent sample rendered for sample position number 4*J in the plurality of sample positions may be stored in sample position number 4*J+2 and a third transparent sample rendered for sample position number 4*J may be stored in sample position number 4*J+3.

In some embodiments, memory locations may be tagged as valid only for transparent samples. The tags may be used to identify a common set of samples including an opaque sample and one or more transparent samples for a specific sample position. Memory locations may be tagged when a first occurrence of an Nth transparent sample initiates a reduction in the number of opaque samples. For example, when the number of samples per pixel is a multiple of 4, the first occurrence of a second transparent sample (for a sample position that will be retained) initiates the tagging of samples for all sample positions numbered 4*J+2 and 4*J+3 as only valid for transparent samples (J is a non-negative integer).

Figure 14:
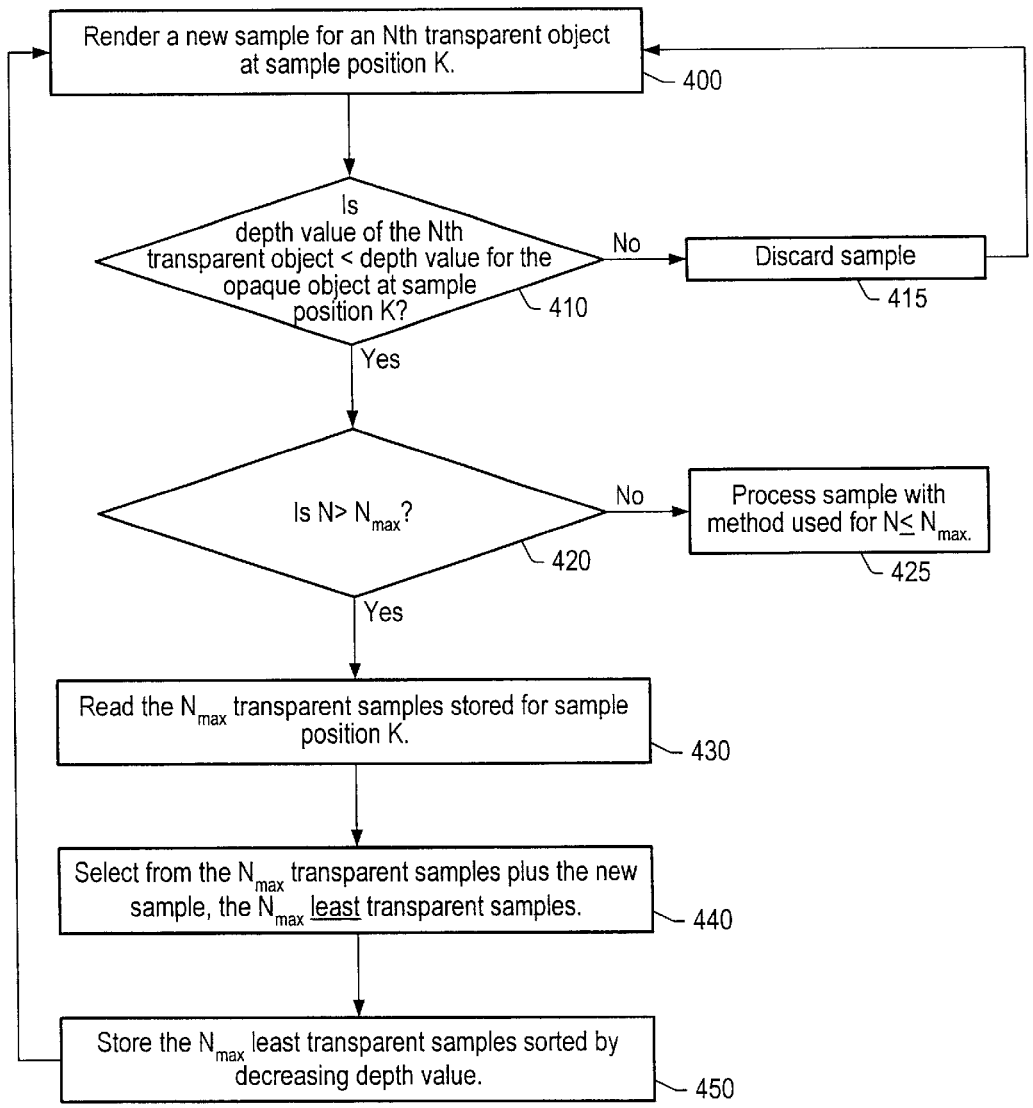
FIG. 14 provides a flow chart of another set of embodiments of a method that may enable multi-layer transparency.

In some images, the number of transparent samples for a sample position may exceed the maximum possible number of memory locations (Nmax). In some embodiments, one or more samples for the most transparent objects may be discarded so that the number of transparent samples equals the available number of memory locations. The flow chart in FIG. 14 illustrates a set of embodiments of a graphics method capable of rendering opaque 3-dimensional objects and more than Nmax transparent 3-dimensional objects. This method may include:

a) rendering a sample for an Nth transparent object at sample position K, where K is a non-negative integer less than sample density $N_{sd}$ (step 400);

b) discarding the sample if the depth value is greater than the depth value for the opaque sample at sample position K (steps 410 & 415) and processing the next transparent sample rendered (steps 400 through 450);

c) processing the sample as described in FIG. 13, if N is less than or equal to the specified Nmax (steps 420 & 430);

d) reading the Nmax transparent samples stored for sample position K, if N is greater than the specified Nmax (steps 420 & 425);

e) selecting from the Nmax transparent samples plus the new transparent sample the Nmax least transparent samples (step 440); and f) storing the Nmax least transparent samples (step 450) sorted by decreasing depth value.

In general, Nmax (a maximum number of transparent samples per corresponding opaque sample) may be less than or equal to $N_{sd}-1$, but for embodiments with programmable pixel resolution, Nmax may be greater than $N_{sd}-1$. Nmax may be programmable and may be specified by the user.

System for Supporting Multi-Layer Transparency

Figure 15:
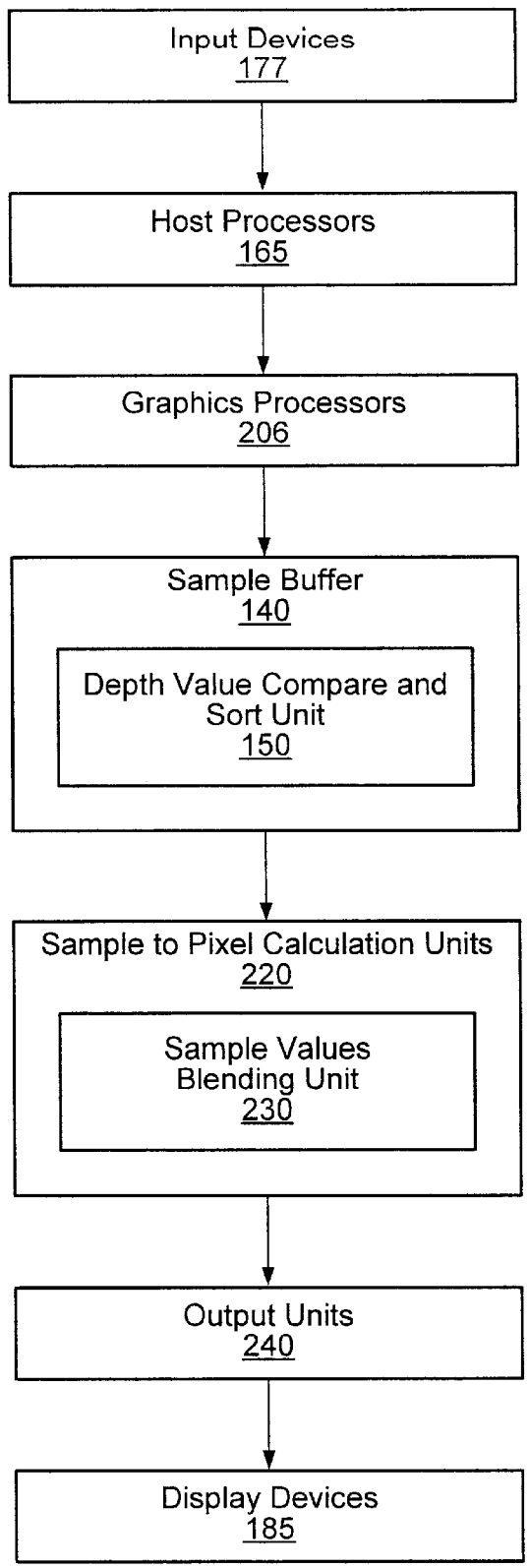
FIG. 15 provides a block diagram of one set of embodiments of a system that may enable multi-layer transparency.

One set of embodiments of a graphics system capable of rendering transparent and opaque objects is illustrated by the block diagram in FIG. 15. The system may include: one or more input devices 177 coupled to a host processor 165; one or more graphics processors 206 (such as first processor 205) (that may receive 3-dimensional graphics data and instructions from the host processor 165 and generate a plurality of samples from the graphics data); one or more memories 140 (e.g., super-sampled sample buffer 140) (that may receive and store the samples from the one or more graphics processors 206, and for each of at least a subset of pixels, the one or more memories 140 may store a first one or more opaque samples and a second one or more transparent samples); one or more sample-to-pixel calculation units 220 (that may receive opaque and transparent samples from the one or more memories 140, and may generate output pixels based on the opaque and transparent samples); and one or more output units 240 (e.g., digital-to-analog conversion devices) that may receive the output pixels and send corresponding output signals to the one or more display devices 185.

In various embodiments, sample-to-pixel calculation units may be configured to generate output pixels in real time without buffering frames of the pixels. Thus, pixel are delivered to the display devices with reduced latency.

The 3-dimensional graphics data may represent one or more 3-dimensional opaque objects and one or more 3-dimensional transparent objects. For each transparent sample stored in memory 140, there is a corresponding opaque sample generated for the same sample position.

The sample-to-pixel calculation units 220 may generate one or more respective pixels, for each of a set of corresponding subsets of samples, that incorporate sample values corresponding to at least one opaque and one or more transparent objects.

In some embodiments, each sample-to-pixel calculation unit 220 may further comprise a sample values blending unit 230 that may re-order transparent samples that have a common sample position, in order of decreasing depth value and may blend the transparent samples with the corresponding opaque sample. Each memory 140 may also include a depth value compare and sort unit 150 that may perform a depth value comparison for multiple opaque objects at a sample position and may only store sample values for the opaque object with a minimum depth value.

In other embodiments, the depth value compare and sort unit 150 may also perform a depth value comparison for multiple transparent objects at a sample position and may store the sample values for the multiple transparent objects in order of decreasing depth value. In these embodiments, each sample-to-pixel calculation unit 220 may include a sample values blending unit 230 that blends the ordered transparent samples that have a common sample position with the corresponding opaque sample.

In various embodiments described above, the repeated and conditional discarding of opaque object information to make room for more transparent object information at lower spatial resolution is performed within the confines of each render pixel. The same principle may be applied to tiles of render pixels. A tile may be a PxQ rectangle of render pixels, where P and Q are positive integers. Thus, in one set of embodiments, a method for generating samples representing one or more 3-dimensional objects may include:

(a) storing a plurality of opaque samples in a plurality of memory locations corresponding to a plurality of sample positions, wherein the plurality of sample positions correspond to a tile of render pixels, and wherein the plurality of opaque samples correspond to at least one opaque object;

(b) generating a first transparent sample for a sample position of the plurality of sample positions, wherein the first transparent sample corresponds to a transparent object at the sample position;

(c) storing the first transparent sample in a neighboring one of the memory locations which currently stores an opaque sample; and (d) generating an output pixel using at least the first transparent sample and the corresponding opaque sample.

Various embodiments described above make mention of performing depth comparisons and of sorting samples (e.g., transparent samples) with respect to a depth which increases with increasing distance from a viewer (or view point). It is noted that samples may be compared and/or sorted based on any of a variety of measures $\theta$ of depth. For example, in one set of embodiments, the depth measure $\theta$ for a sample S may equal $W_f/W_S$, where $W_S$ is the W coordinate for the sample S and $W_f$ is the W coordinate at the front clipping plane. In another embodiment, the depth measure $\theta$ for a sample S may equal $C_1 - C_2/z_S$, where $C_1$ and $C_2$ are constants and $z_S$ is a z coordinate of the sample. In yet another embodiment, the depth measure $\theta$ may equal $z_S$. Any of a variety of monotonic functions (increasing or decreasing) of $z_S$ or $W_S$ are contemplated.

Depth comparisons are performed to determine when a new sample is to overwrite a stored sample. For a depth measure $\theta$ which is an increasing function of distance from the viewer, "A less than B" is the appropriate comparison to determine if A information should overwrite B information. However, the reverse comparison "A greater than B" is appropriate if the depth measure is a decreasing function of distance from the viewer. Similarly, the sort order for sorting samples reverses when an increasing function is used instead of a decreasing function.

In some embodiments, the infinite background is defined to be an opaque object. Thus, the samples initially occupying each render pixel may be initialized as all opaque and all infinitely far away (e.g., $W_f/W=0$).

In one set of embodiments, the host sends the opaque objects of a scene to the graphics processors in a first rendering pass. At the conclusion of the first rendering pass, the sample buffer contains a frame of opaque samples which represent the visible surface of the opaque object set with respect to the viewer. After the first rendering pass, the host may send down the transparent objects of a scene to the graphics processors. In the second rendering pass, the graphics processors and sample buffer may execute the methodology described above for increasing the number of transparent samples stored per sample position at the expense of decreasing the spatial resolution of sample positions with a render pixel (or tile of render pixels). Any transparent sample that is farther from the viewer than the opaque sample at the same sample position may be immediately discarded.

In another set of embodiments, the host sends down a mixed stream of opaque objects and transparent objects. In this case, a transparent sample may be carried for a period of time until it is superceded by a subsequently discovered opaque sample closer to the viewer at the same sample position. Thus, transparent samples may be discarded in favor of closer opaque samples.

In other embodiments, the graphics system may render opaque and transparent objects in any desired number of rendering passes.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method for generating samples representing one or more 3-dimensional objects, the method comprising:

storing a plurality of opaque samples in a plurality of memory locations corresponding to a plurality of sample positions, wherein the plurality of sample positions correspond to a pixel, and wherein the plurality of opaque samples correspond to at least one opaque object;

generating a first transparent sample for a sample position of the plurality of sample positions, wherein the first transparent sample corresponds to a transparent object at the sample position;

storing the first transparent sample in a neighboring one of the memory locations which currently stores an opaque sample; and generating a pixel using at least the first transparent sample and the corresponding opaque sample.

2. The method of claim 1, wherein a first transparent sample, for an odd numbered sample position of the plurality of sample positions, is discarded.

3. The method of claim 1, wherein for the first occurrence of a visible transparent sample for a transparent object at an even numbered sample position of the plurality of sample positions, the number of opaque sample positions available per pixel is reduced by a factor of two, and wherein the visible transparent sample has a depth value less than the depth value of the opaque object at the even numbered sample position.

4. The method of claim 3, wherein the first visible transparent sample for an even numbered sample position of the plurality of sample positions initiates the tagging of memory locations for all odd numbered sample positions as only valid for transparent samples.

5. The method of claim 3, wherein the first transparent sample rendered for one of the even numbered sample positions in the plurality of sample positions is stored in the next odd numbered sample position.

6. The method of claim 3, wherein for a first occurrence of a second visible transparent sample for a sample position with a sample position number of 4 times K, the number of opaque sample positions available per pixel is further reduced by a factor of 2, and wherein K is a non-negative integer and the number of sample positions per pixel is a multiple of 4.

7. The method of claim 6, wherein the second transparent sample initiates the tagging of samples for all sample positions numbered 4K+2 and 4K+3 as only valid for transparent samples.

8. The method of claim 6, wherein the second transparent sample rendered for sample position number 4K in the plurality of sample positions is stored in sample position number 4K+2 and tagged as a transparent sample.

9. The method of claim 1, wherein a maximum number of transparent samples per corresponding opaque sample is specified.

10. The method of claim 1, further comprising:
storing multiple transparent samples for a sample position;
sorting the multiple transparent samples for a sample position by depth values; and
storing the multiple transparent samples in order of decreasing depth value.

11. The method of claim 1, wherein at least the first sample position in the plurality of sample positions corresponding to a pixel contains a sample for an opaque object.

12. The method of claim 1, wherein if the number of transparent samples exceeds the available number of memory locations for a sample position, then the sample for the most transparent object is discarded so that the number of transparent samples equals the available number of memory locations.

13. The method of claim 1, wherein the storing of transparent samples is limited to a specified portion of the frame corresponding to a specified portion of the image that contains transparent objects.

14. The method of claim 1, wherein processing transparent samples and generating pixels is performed at a rate to support a real time video output.

15. A method for generating samples representing one or more 3-dimensional objects, the method comprising:
storing one or more opaque samples, for one or more sample positions of a plurality of sample positions corresponding to a pixel, in memory locations corresponding to the positions of the one or more opaque samples, wherein the one or more opaque samples correspond to at least one opaque object;
storing one or more transparent samples, rendered for a sample position of a plurality of sample positions corresponding to a pixel, in the one or more memory locations sequential to the memory location corresponding to the sample position, wherein the one or more transparent samples correspond to at least one transparent object; and
generating a pixel using at least one opaque sample, for a sample position of the plurality of sample positions corresponding to the pixel, and at least one transparent sample corresponding to the sample position.

16. A method for operating a graphics system comprising:
receiving 3-dimensional graphics data, wherein the 3-dimensional graphics data comprises a plurality of graphics primitives representing one or more opaque objects and one or more transparent objects;
rendering the graphics primitives to samples;
storing the rendered samples in a sample buffer, wherein for at least one of the opaque samples stored in the sample buffer, there are one or more transparent samples stored in the sample buffer, wherein the one or more transparent samples were rendered for the same sample position as the corresponding opaque sample; and
filtering the stored samples at least once per screen refresh cycle to generate output pixels.

17. The method of claim 16, further comprising providing the output pixels to a display device, wherein the output pixels are not stored in a frame buffer.

18. A method for generating samples representing one or more 3-dimensional objects, the method comprising:
storing a plurality of opaque samples for a plurality of sample positions, wherein the plurality of sample positions correspond to a pixel, and wherein the plurality of opaque samples correspond to at least one opaque object;
generating a first transparent sample for a sample position of the plurality of sample positions, wherein the first transparent sample corresponds to a transparent object at the sample position;
storing the first transparent sample in another one of the sample positions that currently stores an opaque sample;
generating a pixel using at least the first transparent sample and the corresponding opaque sample.

19. The method of claim 18, wherein said another one of the sample positions is one of the plurality of sample positions corresponding to a pixel.

20. The method of claim 18, wherein storing a plurality of opaque samples further comprises performing a depth value comparison between a new opaque sample for a sample position and a previously stored sample for the sample position, and replacing the stored sample with the new opaque sample if the new opaque sample has a depth value less than the previously stored sample.

21. The method of claim 18, wherein said generating comprises, for at least one respective sample position, sorting one or more transparent samples corresponding to the respective sample position, wherein said sorting is performed to order the samples by decreasing depth values.

22. The method of claim 21,
wherein said sorting produces sorted transparent samples; and
wherein the method further comprises storing the sorted transparent samples in a block of one or more memory locations previously occupied by the transparent samples prior to sorting.

23. The method of claim 21,
wherein said sorting produces sorted transparent samples; and
wherein said generating generates the pixel without storing the sorted transparent samples after said sorting.

24. The method of claim 18, further comprising:
repeating said generating a first transparent sample and said storing a first transparent sample one or more times for one or more additional transparent objects.

25. The method of claim 24, wherein said repeating comprises maintaining at least one opaque sample in at least one of the sample positions.

26. The method of claim 18, further comprising discarding a portion of the plurality of opaque samples corresponding to the plurality of sample positions in response to generating a first transparent sample for a sample position of the plurality of sample positions.

27. The method of claim 18, further comprising discarding a sample rendered for a transparent object if the transparent object has a depth value greater than the depth value of an opaque sample stored for the same sample position.

28. The method of claim 18, wherein said storing comprises storing the first transparent sample in a specific neighboring sample position of the first sample position.

29. The method of claim 18, wherein the plurality of opaque samples correspond to one or more opaque objects.

30. The method of claim 18, further comprising:

receiving graphics data corresponding to a set of opaque objects; and rendering samples from the graphics data corresponding to a set of opaque objects.

31. The method of claim 18, wherein storing a plurality of opaque samples further comprises:

performing a depth value comparison between a new opaque sample and a stored opaque sample for a sample position; and replacing the stored opaque sample with the new opaque sample if the depth value of the new opaque sample is less than the depth value of the stored opaque sample.

32. A system for generating samples representing one or more 3-dimensional objects, the system comprising:

means for storing a plurality of opaque samples for a plurality of sample positions, wherein the plurality of sample positions correspond to a pixel, and wherein the plurality of opaque samples correspond to at least one opaque object;

means for generating a first transparent sample for a sample position of the plurality of sample positions, wherein the first transparent sample corresponds to a transparent object at the sample position;

means for storing the first transparent sample in a memory location which currently stores an opaque sample for a different sample position; and means for generating a pixel using at least one of the opaque samples and the first transparent sample.

33. A system for generating samples representing one or more 3-dimensional objects, the system comprising:

means for storing a plurality of opaque samples in a plurality of memory locations corresponding to a plurality of sample positions, wherein the plurality of sample positions correspond to a pixel, and wherein the plurality of opaque samples correspond to at least one opaque object;

means for generating a first transparent sample for a sample position of the plurality of sample positions, wherein the first transparent sample corresponds to a transparent object at the sample position;

means for storing the first transparent sample in a neighboring one of the memory locations which currently stores an opaque sample; and means for generating a pixel using at least the first transparent sample and the corresponding opaque sample.

34. A graphics system comprising:

one or more graphics processors configured to receive graphics data and generate a plurality of samples from the graphics data;

one or more memories coupled to receive and store the samples from the one or more graphics processors, wherein, for each of at least a subset of pixels, the one or more memories store a first one or more opaque samples and a second one or more transparent samples; and one or more sample-to-pixel calculation units coupled to receive samples from the one or more memories, wherein the one or more sample-to-pixel calculation units are configured to generate output pixels based on the opaque and transparent samples.

35. The graphics system of claim 34, wherein the graphics data represents one or more 3-dimensional opaque objects and one or more 3-dimensional transparent objects.

36. The graphics system of claim 34, wherein, for each transparent sample there is a corresponding opaque sample generated for the same sample position.

37. The graphics system of claim 34, wherein, for each of the at least a subset of the pixels, a sample-to-pixel calculation unit generates a respective pixel that incorporates sample values corresponding to at least one opaque and one or more transparent objects.

38. The graphics system of claim 34, wherein each sample-to-pixel calculation unit further comprises a sample values blending unit configured to reorder transparent samples that have a common sample position, in order of decreasing depth value and to blend the transparent samples with the corresponding opaque sample.

39. The graphics system of claim 34, wherein each sample-to-pixel calculation unit further comprises a sample values blending unit configured to blend transparent samples that have a common sample position with the corresponding opaque sample.

40. The graphics system of claim 34, wherein the one or more sample-to-pixel calculation units generate output pixels in real time.

41. The graphics system of claim 34, wherein the one or more memories is a super-sampled sample buffer.

42. The graphics system of claim 34, wherein each memory further comprises a depth value compare and sort unit configured to perform a depth value comparison for multiple opaque objects at a sample position and to store sample values for the opaque object with a minimum depth value.

43. The graphics system of claim 34, wherein each memory further comprises a depth value compare and sort unit configured to perform a depth value comparison for multiple transparent objects at a sample position and to store the sample values for the multiple transparent objects in order of decreasing depth value.

44. The graphics system of claim 34, further comprising one or more output units and one or more display devices, wherein the one or more sample-to-pixel calculation units are configured to convey the output pixels to the one or more output units that send signals to the one or more display devices.

45. The graphics system of claim 34, wherein the sample-to-pixel calculation unit is configured to convey the output pixels to output units which then send signals to the display devices without storing the output pixels in an intervening frame buffer.

46. The graphics system of claim 34, further comprising one or more input devices coupled to a host processor that sends 3-dimensional graphics data and instructions to the graphics processor.

47. The graphics system of claim 34, further comprising:

one or more input devices;

a host processor coupled to the one or more input devices configured to send 3-dimensional graphics data to the graphics processor;

one or more output units; and one or more display devices, wherein the one or more sample-to-pixel calculation units are configured to convey output pixels to the one or more output units which send output signals to the one or more display devices.

48. A method for generating samples representing one or more 3-dimensional objects, the method comprising:

storing a plurality of opaque samples in a plurality of memory locations corresponding to a plurality of sample positions, wherein the plurality of sample positions correspond to a tile of render pixels, and wherein the plurality of opaque samples correspond to at least one opaque object;

generating a first transparent sample for a sample position of the plurality of sample positions, wherein the first transparent sample corresponds to a transparent object at the sample position;

storing the first transparent sample in a neighboring one of the memory locations which currently stores an opaque sample; and generating an output pixel using at least the first transparent sample and the corresponding opaque sample.

* * * * *